United States Patent
Hirai et al.

(10) Patent No.: US 7,062,068 B2
(45) Date of Patent: Jun. 13, 2006

(54) DATA PROCESSING APPARATUS, DATA PROCESSING METHOD, AND PROGRAM

(75) Inventors: Jun Hirai, Tokyo (JP); Takashi Kohashi, Tokyo (JP)

(73) Assignee: Sony Corporation (JP)

( * ) Notice: Subject to any disclaimer, the term of this patent is extended or adjusted under 35 U.S.C. 154(b) by 610 days.

(21) Appl. No.: 10/258,890

(22) PCT Filed: Mar. 7, 2002

(86) PCT No.: PCT/JP02/02111

§ 371 (c)(1),
(2), (4) Date: Mar. 24, 2003

(87) PCT Pub. No.: WO02/073959

PCT Pub. Date: Sep. 19, 2002

(65) Prior Publication Data

US 2003/0154377 A1    Aug. 14, 2003

(30) Foreign Application Priority Data

Mar. 8, 2001  (JP) .............................. 2001-64365

(51) Int. Cl.
*G06K 9/00* (2006.01)
(52) U.S. Cl. ...................... 382/100; 380/201; 380/203; 386/94; 399/366
(58) Field of Classification Search ................ 382/100, 382/232, 240; 380/51, 54, 201, 203, 210, 380/252, 287; 370/522–529; 713/160, 176, 713/179, 189; 399/45, 366; 283/902; 386/94; 704/200.1, 273; 705/57, 58; 358/3.28
See application file for complete search history.

(56) References Cited

U.S. PATENT DOCUMENTS

| | | | | |
|---|---|---|---|---|
| 6,285,774 B1* | 9/2001 | Schumann et al. | ......... | 382/100 |
| 6,556,774 B1* | 4/2003 | Tsumagari et al. | ............ | 386/95 |
| 6,577,811 B1* | 6/2003 | Kikuchi et al. | ............... | 386/98 |
| 6,590,998 B1* | 7/2003 | Rhoads | ....................... | 382/100 |
| 6,912,652 B1* | 6/2005 | Ito et al. | ..................... | 713/151 |

* cited by examiner

*Primary Examiner*—Jingge Wu
*Assistant Examiner*—Abolfazl Tabatabai
(74) *Attorney, Agent, or Firm*—Lerner, David, Littenberg, Krumholz & Mentlik, LLP

(57) ABSTRACT

A copy control technique using digital watermark information, which makes it possible to prevent a content from being erroneously subjected to a copy control process according to wrong copy control information at a content-to-content transition. Copy control information in the form of digital watermark information (WM) is embedded in a content to control copying of the content in accordance with the embedded copy control information. A content-to-content transition is detected by detecting a change in a content state, such as a change in image luminance, or a change in copy control information associated with a content, or is detected on the basis of a flag, a descriptor, or channel switching. In response to detection of a content-to-content transition, a reset signal is output to a WM analyzer to reset current copy control information into a "undefined" state, so that copy control is performed in a mode such as a copy-free mode assigned to the "undefined" state.

17 Claims, 20 Drawing Sheets

FIG. 4
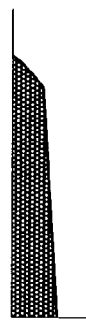
(a) COPY CONTROL SIGNAL SPECTRUM BEFORE BEING SUBJECTED TO SS SPREADING PROCESS
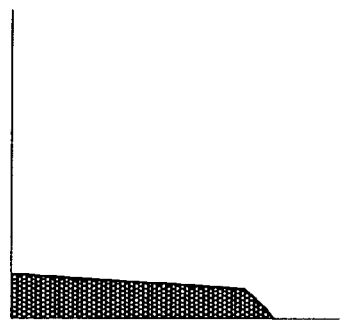
(b) COPY CONTROL SIGNAL SPECTRUM AFTER BEING SUBJECTED TO SS SPREADING PROCESS
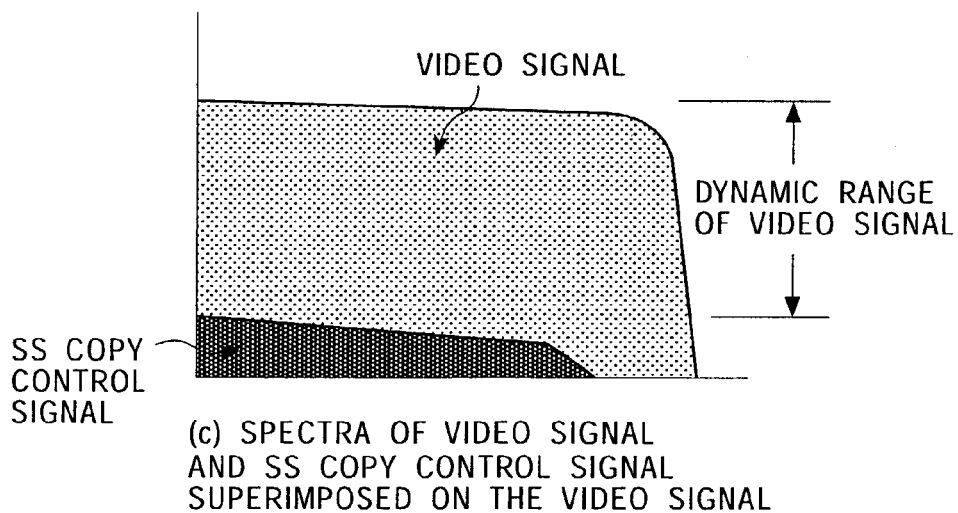
(c) SPECTRA OF VIDEO SIGNAL AND SS COPY CONTROL SIGNAL SUPERIMPOSED ON THE VIDEO SIGNAL
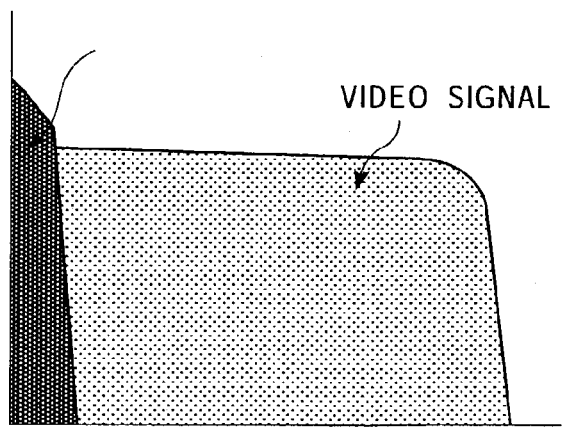
(d) SPECTRUM OF DESPREAD SIGNAL

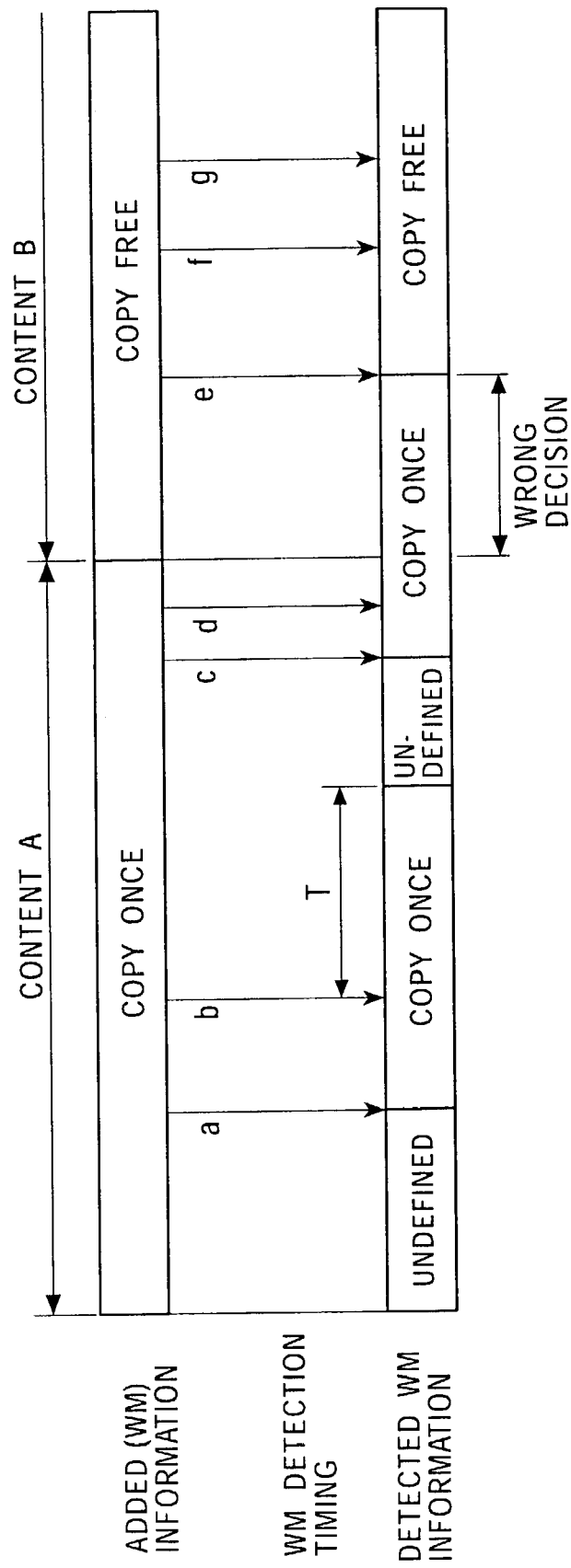

DATA PROCESSING APPARATUS, DATA PROCESSING METHOD, AND PROGRAM

TECHNICAL FIELD

The present invention relates to a data processing apparatus, a data processing method, and a program, for controlling copying of an information signal such as an image or audio signal, and more particularly, to a data processing apparatus, a data processing method, and a program, for recording, inputting/outputting, or playing back an information signal such as an image or audio signal.

BACKGROUND ART

With recent advances in the digital technology, digital record/playback apparatuses have become popular which are capable of recording and playing back data many times without causing degradation in image/sound quality. In such a situation, a large number of digital contents of various fields, such as video and music contents, are transmitted and distributed using recording media such as a DVD or a CD or through a communication network.

In digital recording/playing back, unlike analog recording/playing back, high quality similar to that of original data can be maintained, because data can be recorded and played back repeatedly many times without causing data to be degraded. However, the popularity of such high-quality digital recording/playing back technology results in spreading of a large number of illegally copied data, and thus serious problems in protection of copyright have arise.

To protect copyrights of digital contents from being pirated by illegal copying, it has been proposed to add copy control information for control copying to digital contents and read the copy control information when digital contents are recorded or played back thereby preventing digital contents from illegally copied.

Controlling of copying of contents can be performed in many modes depending on information sources. For example, any copying is prohibited in one mode, but in another mode, copying from original data is permitted only once and further copying from the copied data is prohibited (this mode is called copy generation management).

A typical copy generation management method is known as the CGMS (Copy Generation Management System) method.

When the CGMS method is applied to an analog video signal, copy control information (CGMS-A information) is described by 2 bits in a total of 20 bits of additional information and superimposed on a luminance signal of a video signal in a specific horizontal interval within a vertical blanking period. In the case of a NTSC video signal, the specific horizontal interval described above is the 20th effective horizontal interval. In the case of a digital video signal, 2-bit copy control information (CGMS-D information) is inserted into the digital video data, and the digital video data is transmitted together with the inserted copy control information.

The 2-bit information according to the CGMS method (hereinafter, referred to as the CGMS information) has one of the following values, depending on the copy control mode: "00" (copying is permitted freely), "10" (copying is permitted once (one-generation copying is permitted)), and "11" (copying is prohibited (unconditionally)).

In a case in which CGMS information added to image information has a value of "10", a recording apparatus adapted to the CGMS method determines that the received video signal is permitted to be copied, and records the video signal. In this case, CGMS information rewritten into "11" is added to the recorded video signal. On the other hand, in a case in which CGMS information added to video information to be recorded has a value of "11", the recording apparatus adapted to the CGMS method determines that the video signal is prohibited to be copied, and the recording apparatus does not record it. An IEEE1394 interface is known in the art as an interface for digital video data. It has been proposed to use CGMS information to protect copyrights of data transmitted via the IEEE1394 interface.

In addition to the copy control method using CGMS information, there are many other known methods for protect copyrights of contents. For example, in digital broadcastings performed by broadcasting stations, digital copy control descriptor is stored in serving information (SI) included in a transport stream (TS) packet by which digital data is carried. When digital data received by a receiver is recorded using a recording apparatus, generation-based copy control is performed in accordance with the digital copy control descriptor.

It has been proposed to describe copy control information in the form of a digital watermark (WM) that cannot be viewed or perceived when a content (such as video data or audio data) in which the digital watermark is embedded is played back in a normal manner. When the content is processed by an apparatus such as a receiver, a recorder, or a player, the digital watermark (WM) is detected, and generation-based copy control is performed in accordance with the detected digital watermark (WM).

Because digital watermarks can be detected and embedded only by specific devices, tampering with data is very difficult. Thus, in this technique, data is highly reliable compared with the CGMS method in which control information is added in the form of bit data.

However, a problem of this technique is that the detected level of digital watermark information greatly varies depending on the content of an information signal (such as a video or audio content) to which a digital watermark is added or various processes such as data compression, decompression, or scrambling, performed on the signal after the digital watermark was added to the content, and thus the time needed to detect the digital watermark information from the content varies depending on the content.

More specifically, in the process of detecting a digital watermark embedded in video data, although the digital watermark can be detected instantaneously in some cases, there is a possibility that the digital watermark cannot be detected in a long continuous period such as few seconds or few ten seconds depending on the video data.

FIG. 20 shows an example of a process of detecting a digital watermark embedded as copy control information in data. In this example shown in FIG. 20, a digital watermark is detected when digital data broadcasted from a station is received or the received digital data is recorded. In digital broadcasts provided by broadcasting stations, various programs are provided one after another, and various commercial messages provided by sponsors are inserted between programs. Thus, copyright of contents provided via broadcasting varies frequently and sequentially.

In a case in which a digital watermark is embedded as copy control information, a digital watermark functioning as copy control information indicating that copying should be controlled in the Copy Free mode, the Copy Once mode, or the Never Copy mode is embedded in each content of programs and commercial messages.

In the example shown in FIG. 20, a digital watermark functioning as copy control information indicating that copying should be controlled in the Copy Once mode is embedded in a content provided during a period A, and a digital watermark functioning as copy control information indicating that copying should be controlled in the Copy Free mode is embedded in a content provided during a period B. In a receiver or a record/playback apparatus, a digital watermark is detected from a content and the content is recorded into a digital device.

When a content having copy control information indicating that copying should be controlled in the Copy Once mode is digitally recorded by a digital recording apparatus adapted to recording (playing back) of contents according to copy control information, if copy control information indicating that copying should be controlled in the Copy Once mode is detected from the content, the digital recording apparatus rewrites the copy control information into No More Copy and records the content together with the rewritten copy control information. Thus, if the content recorded by the digital recording apparatus is tried to be further recorded into another digital device, copying is prevented by the copy control information set to No More Copy.

Detection of a digital watermark from a content is performed repeatedly for each image frame. However, as described earlier, the levels of detected digital watermarks, that is, the detected levels, vary depending on the condition of the video data, and the digital watermarks cannot be accurately detected unless the detected levels are higher than a predetermined threshold (Th). Therefore, the digital watermarks are read only when the detected levels are higher than the threshold (Th). If a digital watermark includes copy control information, copying is controlled in accordance with the detected copy control information. More specifically, in accordance with the control information, deciding whether to permit the operation of recording the content onto a recording medium is performed, and the copy control information is rewritten, for example, from Copy Once to No More Copy.

In FIG. 20, detection timing arrows (denoted by a, b, c, d, e, f, and g) indicate times at which digital watermarks having a level higher than the threshold (Th) is successfully detected. If a digital watermark is detected, the process performed thereafter obeys the detected information at least over a following period with a predetermined length (T). In the case of the content A, because the digital watermark including the copy control information indicating that copying should be controlled in the Copy Once mode is embedded in the content A, copying is controlled in accordance with the copy control information indicating that copying should be controlled in the Copy Once mode. If no digital watermark is detected in a period with the predetermined length (T), the detected information is determined to be "undefined", that is, the process is performed assuming that that no control information is included in the content. There is no obligate rule to be applied to the "undefined" case, and the process for an "undefined" period may be performed, for example, in a similar manner as is performed when the content includes copy control information indicating that copying should be controlled in the Copy Free mode.

In FIG. 20, at a time denoted by a detection timing arrow c, digital watermark information is detected from the content A, and the process is performed in accordance with the detected copy control information indicating Copy Once. Thereafter, at a time (denoted by an arrow d) within a following period of T, a digital watermark including copy control information indicating that copying should be controlled in the Copy Once mode is detected. After that, if the content is switched from A to B, no digital watermark is detected for a while. In this case, the receiver or the record/playback apparatus that is processing the content obeys not to the copy control information (Copy Free) of the content B but to the copy control information (Copy Once) of the content A in an initial period (denoted by "wrong decision" in FIG. 20).

When the digital recording apparatus is recording the content, if the content being recorded is switched from the content A including copy control information indicating Copy Once to the content B including copy control information indicating that copying should be controlled in the Copy Free mode, and if the initial part of the content B (in the "wrong decision" period in FIG. 20) is processed in accordance with the copying control information (Copy Once) of the content A as shown in FIG. 20, the initial part of the content B is recorded together with copy control information rewritten to No More Copy indicating that no more copying is permitted in accordance with the copy control information (Copy Once) of the content A, although the initial part of the content A is actually permitted to be freely copied. Thus, there occurs a problem that the initial part of the content B cannot be further copied, although that part should be permitted to be copied.

SUMMARY OF THE INVENTION

In view of the above, an object of the present invention is to provide a technique of controlling copying of a content in accordance with copy control information described in the form of a digital watermark that cannot be easily tampered with, so as to solve the problems caused by variations in detection timing of digital watermarks at a content-to-content transition, and so as to prevent a current content from being processed in accordance with wrong copy control information assigned to a previous content after the previous content is switched to the current content, thereby ensuring that copying is controlled correctly.

According to a first aspect of the present invention, there is provided a data processing apparatus for performing at least one of data processes including a data recording process, a data playing-back process, and a data inputting/outputting process, in which copy control information represented in digital watermark information is detected, and copying of data is controlled in accordance with the detected copy control information included in the digital watermark information, the data processing apparatus including digital watermark decoding means for detecting a digital watermark embedded in a content and outputting detected copy control information as control information applied to a content to be processed, the digital watermark decoding means including:

state change detection means for detecting a transition from a content to another content having a possibility that copy control information embedded therein is different from that embedded in the former content, and outputting a reset signal to digital watermark information analysis means in response to detecting of a state change corresponding to the content transition; and digital watermark information analysis means for resetting control information applied to the content in accordance with the reset signal received from the state change detection means, and outputting, as control information to be applied to the content, "undefined" control information corresponding to non-detection of a digital watermark.

In an embodiment of the data processing apparatus according to the present invention, if the digital watermark information output from the digital watermark information analysis means is "undefined", and if a content to be processed includes copy control information, added thereto, other than digital watermark information, the copy control information other than the digital watermark information is employed as control information to be applied to the content.

In an embodiment of the data processing apparatus according to the present invention, if the digital watermark information output from the digital watermark information analysis means is "undefined", and if a content to be processed includes copy control information, added thereto, other than digital watermark information, history of the copy control information other than digital watermark information and history of copy control information described in the digital watermark information are checked to determine whether these two kinds of copy control information were consistent with each other over a predetermined period, and, if and only if it is determined that the two kinds of copy control information were consistent with each other over that period, the copy control information other than digital watermark information is employed as copy control information to be applied to the content.

In an embodiment of the data processing apparatus according to the present invention, the copy control information other than digital watermark information is CGMS (Copy Generation Management System) information.

In an embodiment of the data processing apparatus according to the present invention, the state change detection means monitors a change in signal information of a content being processed; and, if a change greater than a predetermined threshold is detected, the state change detection means determines that a content-to-content transition has occurred, and the state change detection means outputs a reset signal to the digital watermark information analysis means.

In an embodiment of the data processing apparatus according to the present invention, the state change detection means monitors a change in copy control information serving as additional information other than digital watermark information, added to a content being processed; and, if a change is detected, the state change detection means determines that a content-to-content transition has occurred, and the state change detection means outputs a reset signal to the digital watermark information analysis means.

In an embodiment of the data processing apparatus according to the present invention, the state change detection means monitors a change in a descriptor or a flag serving as additional information other than digital watermark information, added to a content being processed; and, if a change is detected, the state change detection means determines that a content-to-content transition has occurred, and the state change detection means outputs a reset signal to the digital watermark information analysis means.

In an embodiment of the data processing apparatus according to the present invention, the state change detection means monitors channel switching; and, if channel switching is detected, the state change detection means determines that a content-to-content transition has occurred, and the state change detection means outputs a reset signal to the digital watermark information analysis means.

In an embodiment of the data processing apparatus according to the present invention, the state change detection means monitors presence/absence of an input signal and determines that a content-to-content transition has occurred when a presence-to-absence transition, an absence-to-presence transition, or a presence-to-absence-to-presence transition is detected, and the state change detection means outputs a reset signal to the digital watermark information analysis means in response to the detection of the content-to-content transition.

According to a second aspect of the present invention, there is provided a data processing method of performing at least one of data processes including a data recording process, a data playing-back process, and a data inputting/outputting process, in which copy control information represented in digital watermark information is detected, and copying of data is controlled in accordance with the detected copy control information included in the digital watermark information, the data processing method including a digital watermark decoding step of detecting a digital watermark embedded in a content and outputting detected copy control information as control information applied to a content to be processed, the digital watermark decoding step including the steps of:

detecting a transition from a content to another content having a possibility that copy control information embedded therein is different from that embedded in the former content, and outputting a reset signal to digital watermark information analysis means in response to detecting of a state change corresponding to the content transition; and resetting control information applied to the content in accordance with the input reset signal, and outputting, as control information to be applied to the content, "undefined" control information corresponding to non-detection of a digital watermark.

In an embodiment of the data processing method according to the present invention, if the digital watermark information output from the digital watermark information analysis means is "undefined", and if a content to be processed includes copy control information, added thereto, other than digital watermark information, the copy control information other than the digital watermark information is employed as control information to be applied to the content.

In an embodiment of the data processing method according to the present invention, if the digital watermark information output from the digital watermark information analysis means is "undefined", and if a content to be processed includes copy control information, added thereto, other than digital watermark information, history of the copy control information other than digital watermark information and history of copy control information described in the digital watermark information are checked to determine whether these two kinds of copy control information were consistent with each other over a predetermined period, and, if and only if it is determined that the two kinds of copy control information were consistent with each other over that period, the copy control information other than digital watermark information is employed as copy control information to be applied to the content.

In an embodiment of the data processing method according to the present invention, the copy control information other than digital watermark information is CGMS (Copy Generation Management System) information.

In an embodiment of the data processing method according to the present invention, the state change detection step includes monitoring a change in signal information of a content being processed; and, if a change greater than a predetermined threshold is detected, determining that a content-to-content transition has occurred and outputting a reset signal to the digital watermark information analysis means.

In an embodiment of the data processing method according to the present invention, the state change detection step includes monitoring a change in copy control information serving as additional information other than digital watermark information, added to a content being processed; and, if a change is detected, determining that a content-to-content transition has occurred and outputting a reset signal to the digital watermark information analysis means.

In an embodiment of the data processing method according to the present invention, the state change detection step includes monitoring a change in a descriptor or a flag serving as additional information other than digital watermark information, added to a content being processed; and if, a change is detected, determining that a content-to-content transition has occurred and outputting a reset signal to the digital watermark information analysis means.

In an embodiment of the data processing method according to the present invention, the state change detection step includes monitoring channel switching; and, if channel switching is detected, determining that a content-to-content transition has occurred, outputting a reset signal to the digital watermark information analysis means.

In an embodiment of the data processing method according to the present invention, the state change detection step includes monitoring presence/absence of an input signal, determining that a content-to-content transition has occurred when a presence-to-absence transition, an absence-to-presence transition, or a presence-to-absence-to-presence transition is detected, and outputting a reset signal to the digital watermark information analysis means in response to detection of the content-to-content transition.

According to a third aspect of the present invention, there is provided a computer program for causing a computer system to execute at least one of data processes including a data recording process, a data playing-back process, and a data inputting/outputting process, in which copy control information represented in digital watermark information is detected, and copying of data is controlled in accordance with the detected copy control information included in the digital watermark information, the computer program including a digital watermark decoding step of detecting a digital watermark embedded in a content and outputting detected copy control information as control information applied to a content to be processed, the digital watermark decoding step including the steps of:

detecting a transition from a content to another content having a possibility that copy control information embedded therein is different from that embedded in the former content, and outputting a reset signal to digital watermark information analysis means in response to detecting of a state change corresponding to the content transition; and resetting control information applied to the content in accordance with the input reset signal, and outputting, as control information to be applied to the content, "undefined" control information corresponding to non-detection of a digital watermark.

The computer program according to the present invention may be supplied to a general-purpose computer system capable of executing various program codes, via a communication medium or a computer-readable storage medium in which the program is stored.

By providing such a program in a computer-readable form, it becomes possible for a computer system to execute a process in accordance with the program. By installing a particular computer program onto a computer system, it becomes possible to achieve a cooperative operation on the computer system so as to achieve functions similar to those achieved by the other aspects of the present invention.

These and other objects and features of the present invention will become more apparent from the following detailed description of embodiments with reference to the accompanying drawings.

BRIEF DESCRIPTION OF THE DRAWINGS

FIG. 4 is a diagram showing digital watermark information used in the embodiment according to the present invention.

FIG. 20 is a diagram showing a copy control process performed when a content-to-content transition occurs, according to a conventional technique.

DETAILED DESCRIPTION OF THE INVENTION

Figure 1:
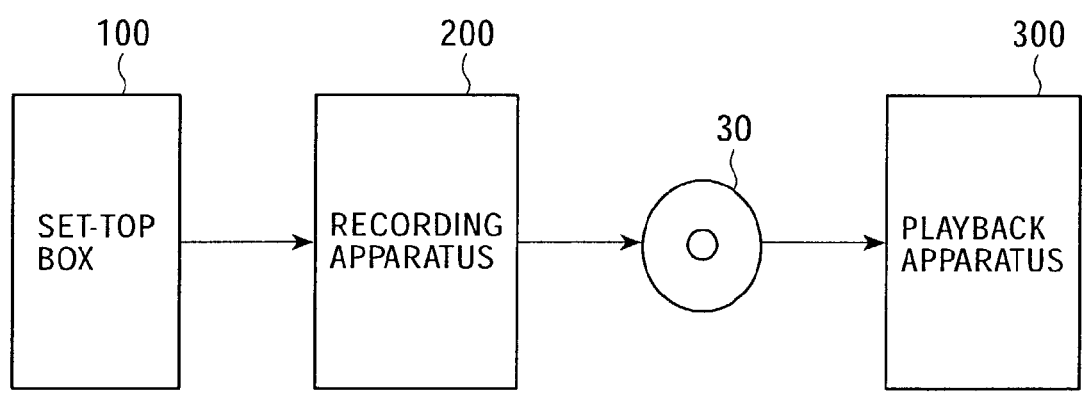
FIG. 1 is a diagram showing a system using a generation-based information signal control method according to an embodiment of the present invention.

Embodiments of a data processing apparatus, a data processing method, and a program, according to the present invention, are described below with reference to the accompanying drawings. In the present invention, copy control information described in the form of digital watermark information WM is stored various kinds of data such as video information, audio information, or a program. In embodiments described below, according to the present invention, by way of example, information to be copy-controlled is video information recorded in the form of digital data on a disk recording medium (such as a DVD (Digital Video Disk)), and both CGMS information and digital watermark information WM are used as additional information used to perform generation-based copy control.

Copy control information in the form of digital watermark information embedded in a content may be set to, for example, one of the following four copy control modes:

(1) "Copy Free" mode: content is permitted to be copied freely (2) "Copy Once" mode: content is permitted to be copied once (3) "No More Copy" mode: further copying of content is not permitted (4) "Never Copy" mode: copying is never permitted One of the four copy control modes is selected depending on a content such as video data or music data and embedded in the content.

In a case in which the copy control information is set to (1) "Copy Free" mode, a content such as music data or video data is permitted to be copied freely. In a case in which the copy control information is set to (2) "Copy Once" mode, a content such as music data or video data is permitted to be only once. If a content such as music data or video data set to (2) "Copy Once" mode is copied, the copy control information is rewritten into the (3) "No More Copy" mode indicating that no more copying is permitted. In a case in which the copy control information is set to (4) "Never Copy" mode, a content is never permitted.

In a case in which digital watermark information superimposed on video data or music data has a value corresponding to "Copy Once", a recording apparatus adapted to the digital watermark processing (that is, a recording apparatus adapted to the copy control processing) determines that the video data or the music data is permitted to be copied, and the recording apparatus records it. In this case, the digital watermark information is rewritten to "No More Copy" and superimposed on the recorded video data or music data. In a case in which digital watermark information superimposed on video data or music data to be recorded indicates "No More Copy", the recording apparatus adapted to the digital watermark processing determines that the video data or the music data is prohibited to be copied, and the recording apparatus does not record it.

In the present embodiment, the digital watermark processing is performed such that additional information for performing generation-based copy control is modulated by means of a spread spectrum technique using a series of PN (Pseudorandom Noise) codes, and the resultant information is superimposed as digital watermark information WM on video information.

When data is recorded on a rewritable recording medium using a recording apparatus, the data is encrypted by means of scrambling according to a predetermined scheme.

In the following description, a rewritable DVD will be referred to as a RAM disk, and an unrewritable read-only DVD will be referred to as a ROM disk. A recording apparatus or a playback apparatus adapted to the generation-based copy control will be referred to as a compliant apparatus, and an apparatus that is not adapted to the generation-based copy control will be referred to as a noncompliant apparatus. Information for controlling copying on the basis of generation will be referred to as copy control information.

In a case in which an information signal is recorded on a ROM disk in a mode in which any copying of the information signal is prohibited, additional information indicating that copying of the information signal is prohibited is added to the information signal recorded on the ROM disk, and the information signal and the additional information are encrypted according to the CSS (Contents Scramble System) method. Note that the encryption scheme employed herein for ROM disks is different from that employed in writing data on a RAM disks.

In the present embodiment described below with reference to FIG. 1, a digital broadcast transmitted via a cable or a radio wave is received by a set-top box (receiver) 100 or the like, and the received signal is recorded on a RAM disk 30 by a recording apparatus 200 disposed separately from the receiver. The signal recorded on the RAM disk 30 is played back by a playback apparatus 300.

In the present embodiment, the set-top box 100 serves as an apparatus for outputting an information signal. Herein, it is assumed that a received video signal includes both CGMS information and digital watermark information WM, functioning as copy control information. Basically, when the video information is output from the set-top box 100, the CGMS information of the output video information is rewritten in accordance with the digital watermark information WM such that no inconsistency occurs between the CGMS information and the digital watermark information. More specifically, the digital watermark information WM that is difficult to tamper with and the CGMS information that is relatively easy to tamper with are compared with each other. If there is inconsistency, the copy control information described in the digital watermark information WM that is difficult to tamper with is determined to be reliable, and the CGMS information is rewritten in accordance with the digital watermark information WM and the result information is output.

However, digital watermark information cannot be always read continuously from a content, and the level of detected digital watermark information varies depending on the content of an information signal (such as a video or audio content) including additional digital watermark or various processes such as data compression, decompression, or scrambling, performed on the signal after the digital watermark was added to the content.

Therefore, in the process of detecting digital watermark information (WM), digital watermarks are read only when the detected levels are higher than a threshold (Th). If the detected level is higher than the threshold (Th) and if the detected digital watermark includes copy control information in one of modes (1) to (4) described above, copying is controlled in accordance with the copy control information. In the case in which the detected level is higher than the threshold (Th) and copy control information in one of modes (1) to (4) is detected from the digital watermark, the process is performed in accordance with the detected digital watermark (WM) over a following holding period with a predetermined length of T. If another digital watermark having a signal level higher than the threshold (Th) is detected successfully within that holding period T, copying is controlled in accordance with the copy control information included in this newly detected digital watermark over a following holding period T.

As described above, if a new digital watermark is detected in a holding period T, a process is performed in accordance with the newly read information. However, if the digital watermark signal level does not exceed the threshold (Th) over a whole holding period T, and thus any new digital watermark is not detected, the copy control information is regarded as being in an undefined state, and the process is performed in a mode assigned to the "undefined" state. The mode assigned to the "undefined" state may be similar to the mode (1) of "Copy Free" described above, if there is any other copy control information that should be applied. However, if there is other copy control information such as CGMS information that should be applied, the process may be performed in accordance with copy control information described in the CGMS information.

In the present embodiment, in which both CGMS information and digital watermark information WM are added as copy control information, if the digital watermark signal level is not high enough and does not exceed the threshold (Th) over a continuous period equal to or longer than a predetermined time (T), copy control information detected from the digital watermark information WM is determined to be "undefined", and the CGMS signal is directly output as copy control information without rewriting the CGMS signal according to the digital watermark information WM.

Also in the playback apparatus 300, CGMS information associated with video information output therefrom is rewritten in accordance with copy control information detected from digital watermark information WM so that no inconsistency occurs between the CGMS information and the digital watermark information. That is, in a case in which CGMS information and digital watermark information are inconsistent with each other, copy control information obtained from the digital watermark information WM, which is more difficult to tamper, is determined to be more reliable than the CGMS information, and the CGMS information is rewritten in accordance with the digital watermark information WM and output.

However, also in the playback apparatus 300, if the digital watermark signal level is not high enough and does not exceed the threshold (Th) over a continuous period equal to or longer than a predetermined time (T), copy control information detected from the digital watermark information WM is determined to be "undefined", and the CGMS signal is directly output as copy control information without rewriting the CGMS signal according to the digital watermark information WM.

In the recording apparatus 200 according to the present embodiment, in a case in which digital watermark information included in a video signal provided from the receiver indicates that copy should be controlled in the "Copy Once" mode, when the received signal supplied from the receiver is recorded by the recording apparatus 200, if the recording apparatus 200 is compliant, the CGMS information is rewritten by the recording apparatus 200 into "11" (Never Copy) in accordance with the digital watermark information WM, and the digital watermark information WM is rewritten from "Copy Once" to "No More Copy".

In a case in which the digital watermark signal level is not high enough and does not exceed the threshold (Th) over a continuous period equal to or longer than a predetermined time (T) and thus copy control information detected from the digital watermark information WM is determined to be "undefined", if the CGMS information has a value of "10" (Copy Once), then, when a received signal supplied from the receiver is recorded by the compliant recording apparatus, the CGMS information is rewritten, as in the previous case, by the compliant recording apparatus from "10" (Copy Once) to "11" (Never Copy), and the digital watermark information WM is rewritten into "No More Copy".

In the present embodiment in which the digital watermark is modulated by means of the spread spectrum technique, when the digital watermark information WM is rewritten, the digital watermark information indicating "Copy Once" is not deleted, but the digital watermark information WM indicating "No More Copy" is superimposed, using a different series of PN codes different in the spread spectrum modulation, on the digital watermark information WM indicating Copy Once.

In this case, the copy control information modulated by means of the spread spectrum technique is superimposed on video information that is the main information signal such that the spread-spectrum copy control information has a much lower level than the level of the video information. Because the copy control information indicating "Copy Once" and that indicating "No More Copy" are respectively modulated using different series of PN codes, both pieces of copy control information can be detected. If copy control information having a mode closer to the Never Copy mode is employed as copy control information of the current digital watermark, the resultant effects are equivalent to those achieved when the copy control information is actually rewritten. In the following description, it is assumed that when a plural pieces of copy control information are detected from digital watermark information WM in a process of checking the digital watermark information WM, one piece of copy control information selected in the above described manner is employed as the result of the checking process.

In the present embodiment, transmission of digital video information between the set-top box 100 and the recording apparatus 200 and transmission between the playback apparatus 300 and the recording apparatus 200 are performed, if they are compliant, in a MPEG-compressed form via an interface according to the IEEE1394 standard. When the interface according to the IEEE1394 standard transmits digital information, the digital information is encrypted to prevent the digital information from being fraudulently copied. Furthermore, the IEEE1394 interface determines whether a destination apparatus is compliant and whether it is a recording apparatus. The IEEE1394 interface also checks additional information (usually, CGMS information) for generation-based copy control and determines, depending on the result of the checking, whether to transmit a key used to decrypt the encrypted digital information.

The communication control scheme described above is called an IEEE1394 secure bus. Use of a digital interface according to this scheme makes it possible to effectively prevent video data from being fraudulently copied.

In the present embodiment, The additional information for generation-based copy control, which is checked to determined whether or not the key necessary in decryption should be transmitted, is acquired from the digital watermark information WM. Alternatively, the decision as to whether the key necessary in decryption should be transmitted may be made in accordance with the CGMS information that has been rewritten in accordance with the digital watermark information.

Now, examples of constructions of the set-top box (receiver) 100, the recording apparatus 200, and the playback apparatus 300 are described below. In the following description on the present embodiment, it is assumed that a broadcast signal includes superimposed digital watermark copy control information, which is modulated by means of the spread spectrum scheme using a first PN code series PNa, and which is rewritten by a compliant recording apparatus by further superimposing digital watermark copy control information modulated by means of the spread spectrum scheme using a second PN code series PNb (different from PNa) so as to perform generation-based copy control.

In the following description, for the purpose of simplicity, digital watermark information indicating that copying should be controlled in the "Copy Once" mode is simply represented as "Copy Once", digital watermark information indicating that copying should be controlled in the "No More Copy" mode is simply represented as "No More Copy", and digital watermark information indicating that copying should be controlled in the "Never Copy" mode is simply represented as "Never Copy".

[Set-Top Box]

Figure 2:
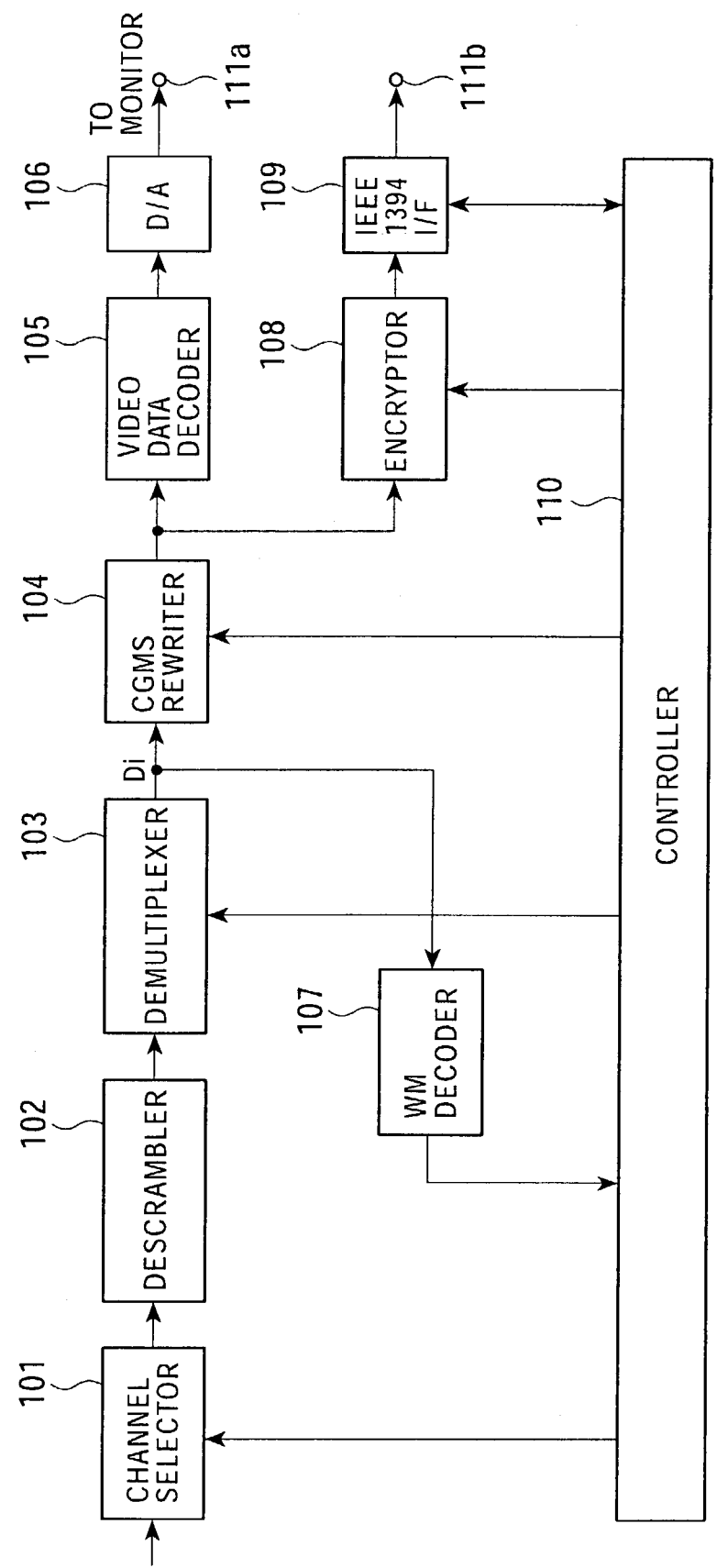
FIG. 2 is a block diagram showing an example of a construction of a set-top box used in the system shown in FIG. 1.

FIG. 2 is a block diagram showing an example of a construction of the set-top box 100 according to the present embodiment.

As shown in FIG. 2, in response to a channel selection operation performed by a user, a channel selection control signal is supplied to a channel selector 101 from a controller 110. The channel selector 101 selects a channel in accordance with the received channel selection control signal and supplies a broadcast signal of the selected channel to a descrambler 102. The descrambler 102 descrambles the broadcast signal. The resultant descrambled signal of the selected channel is supplied to a demultiplexer 103. The broadcast signal output from the channel selector 101 includes a plurality of broadcast programs, and broadcast program data is selected in accordance with a selection control signal which is generated by a controller 110 in accordance with a program selection operation performed by a user.

Video data Di of the selected broadcast program output from the demultiplexer 103 has an MPEG-compressed form. Thus, before the video data Di is supplied to a display monitor or the like, the video data Di output from the demultiplexer 103 is supplied to a video data decoder 105 via a CGMS rewriter 104 to MPEG-decode it into an original uncompressed form. The resultant MPEG-decoded data is converted into an analog signal by a D/A converter 106 and supplied to the display monitor or the like via an analog output terminal 111a.

In the present embodiment the video data Di in the MPEG-compressed form output from the demultiplexer 103 is supplied not only to the CGMS rewriter 104 as described above but also to a digital watermark information decoder (hereinafter referred to as a WM decoder) 107. The WM decoder 107 extracts digital watermark information WM added to the broadcast program data and analyzes the copy control information. The analysis result is supplied to the controller 110.

In the present embodiment, digital watermark information WM is included, in the form of a superimposed spread-spectrum signal, in a video signal. The superimposing is performed, as described earlier such that a PN code used as a spread code is generated at a sufficiently high frequency and additional information functioning as copy control information is multiplied by the generated PN code so as to modulate the additional information into a spread spectrum signal thereby converting the copy control information having a high signal level with a narrow frequency band into a low-level signal with a wide frequency band that imposes no influence on the video signal. The resultant spread-spectrum copy control information is then superimposed on the video data and transmitted.

Figure 3:
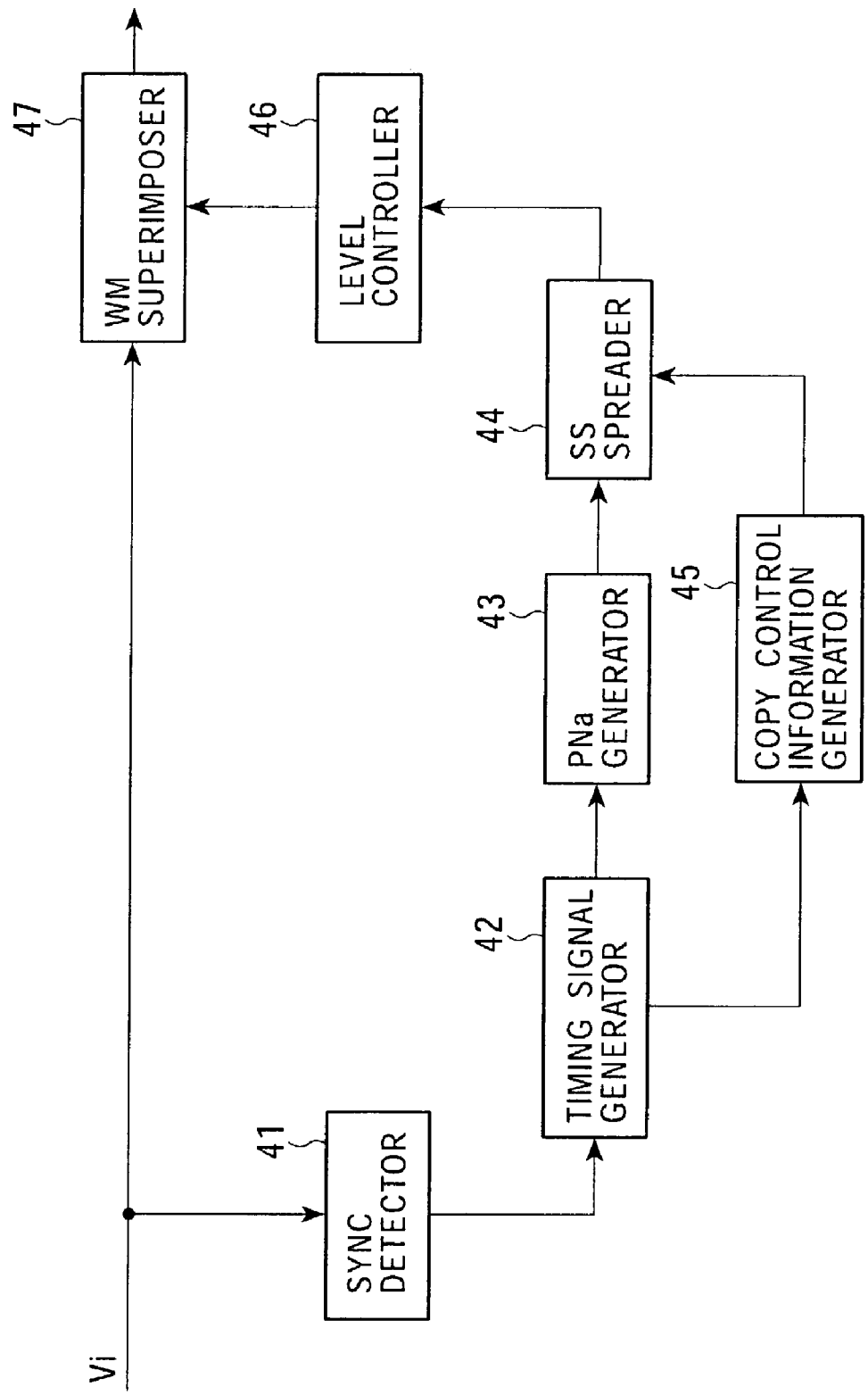
FIG. 3 is a block diagram showing a method of superimposing digital watermark information used by the set-top box according to the embodiment shown in FIG. 2.

FIG. 3 is a block diagram showing a process of superimposing digital watermark information WM on a video signal serving as an information signal. The superimposing process is performed at a broadcasting station. In some cases, a video signal on which digital watermark information WM has been already superimposed is broadcasted by a broadcasting station.

In FIG. 3, a sync detector 41 detects a vertical sync signal from a video signal Vi and supplies the detected sync signal to a timing signal generator 42. The timing signal generator 42 generates a timing signal synchronously with the vertical sync signal.

A PNa generator 43 generates, in synchronization with the timing signal supplied from the timing signal generator 42, a PN code series PNa having a periodic pattern repeating with a period equal to the period of the vertical sync signal and supplies the generated PN code series PNa to an SS (Spread Spectrum) spreader.

A copy control information generator 45 generates copy control information to be superimposed as digital watermark information on the video signal Vi, in synchronization with the timing signal supplied from the timing signal generator 42, and the copy control information generator 45 supplies generated copy control information to the SS spreader 44. In the above process, the copy control information to be superimposed is generated so as to indicate "Copy Free", "Copy Once," or "Never Copy" determined depending on the information to be transmitted.

The SS spreader 44 multiplies the copy control information by the PN code series PNa thereby generating a spread spectrum signal. The SS spreader 44 supplies the generated spread spectrum signal to a digital watermark information WM superimposer 47 via a level controller 46. The WM superimposer 47 superimposes the received spread spectrum signal as digital watermark information on the input video signal Vi. The level controller 46 serves to control the level of the superimposed digital watermark information so that the superimposed digital watermark information will not cause significant degradation in a played back picture. More specifically, the spread-spectrum digital watermark information is superimposed such that the level of the superimposed signal becomes lower than the dynamic range of the video signal.

FIG. 4 shows spectra of a video signal and copy control information superimposed as digital watermark information. The copy control information is a narrow-bandwidth low-bit-rate signal containing a small amount of information, as shown in FIG. 4(a). If such copy control information is subjected to the spread spectrum modulation, the resultant signal has a wide bandwidth as shown in FIG. 4(b) and has a low level inversely proportional to the bandwidth.

The resultant spread-spectrum signal, that is, the spread-spectrum copy control information is superimposed by the WM superimposer 47 on the video signal Vi such that, as shown in FIG. 4(c), the level of the spread-spectrum copy control information becomes lower than the dynamic range of the video signal, thereby substantially preventing the main information signal from being degraded. Thus, when the video signal on which the spread-spectrum copy control signal is superimposed is supplied to the monitor receiver, a high-quality picture can be played back substantially without being influenced by the spread-spectrum copy control information.

If the spread-spectrum demodulation is performed to detect the spread-spectrum copy control information as described later, the spread-spectrum control information is converted into the original signal with the narrow bandwidth as shown in FIG. 4(*d*). If the bandwidth spread ratio is set to a sufficiently large value, the power of the demodulated copy control information becomes higher than that of the information signal, and thus copy control information can be detected.

Because the digital watermark information is superimposed on the video signal over the same period as the video signal and in the same frequency band as the video signal, it is impossible to remove or modify the digital watermark information by means of a frequency filter or by means of simple information replacement.

This means that the spread-spectrum copy control information superimposed on the video signal cannot be removed and thus it cannot be easily tampered with. Therefore, this copy control technique surely prevents the video signal from being fraudulently copied.

In this technique, furthermore, because spread-spectrum modulation is performed using a PN code series having a period equal to the period of the vertical sync signal in synchronization with the vertical sync signal, a PN code series used to perform the spread-spectrum demodulation to detect the spread-spectrum signal from the video signal can be easily generated on the basis of a signal synchronous with the vertical sync signal detected from the video signal.

Figure 5:
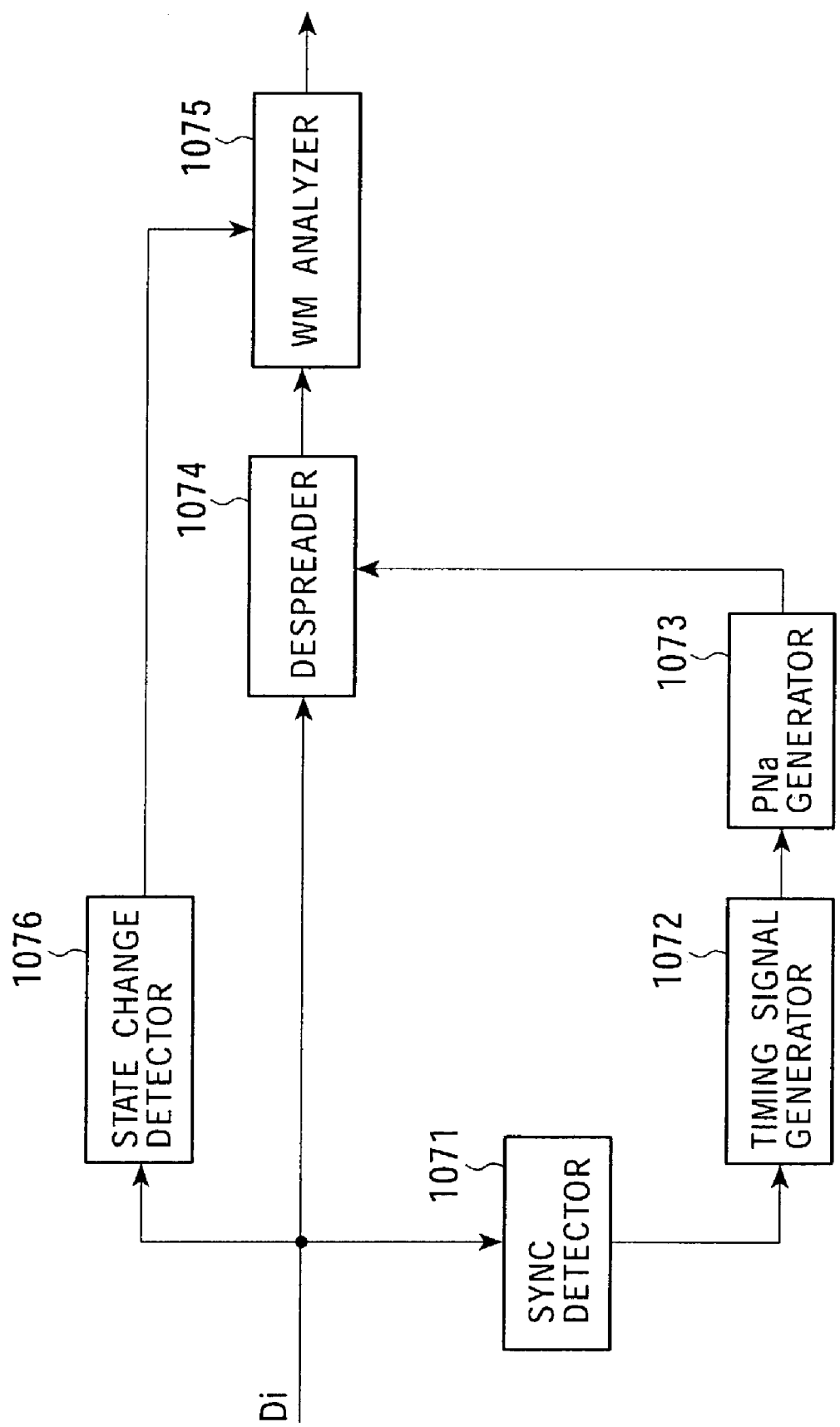
FIG. 5 is a block diagram showing a construction of a WM decoder in the set-top box according to the embodiment shown in FIG. 2.

The WM decoder 107 for extracting the spread-spectrum copy control information superimposed as digital watermark information WM and analyzing the detected copy control information can be constructed as shown in FIG. 5. That is, as shown in FIG. 5, the video data Di output from the demultiplexer 103 is supplied to a despreader 1074 and a sync detector 1071. The video data Di output from the demultiplexer 103 is also supplied to a state change detector 1076. The sync detector 1071 detects vertical synchronization timing and supplies the detected vertical synchronization timing signal to a timing signal generator 1072. The state change detector 1076, detects the timing of a content-to-content transition, for example, on the basis of the video data Di, and outputs detection information to a WM analyzer 1075.

The timing signal generator 1072 supplies a vertical synchronization timing signal to a PNa generator 1073. The PNa generator 1073 generates a PN code series identical to that generated by the PNa generator 43 in the apparatus, shown in FIG. 3, in which the superimposing is performed, such that the PN code series PNa is generated with the same vertical synchronization timing as that in the apparatus in which the superimposing is performed. The PN code series PNa output from the PNa generator 1073 is supplied to the despreader 1074 to obtain copy control information described in the spread-spectrum digital watermark information WM. The obtained copy control information is supplied to the WM analyzer 1075 to detect the copy control mode. A signal indicating the detected copy control mode is supplied to the controller 110.

Figure 6:
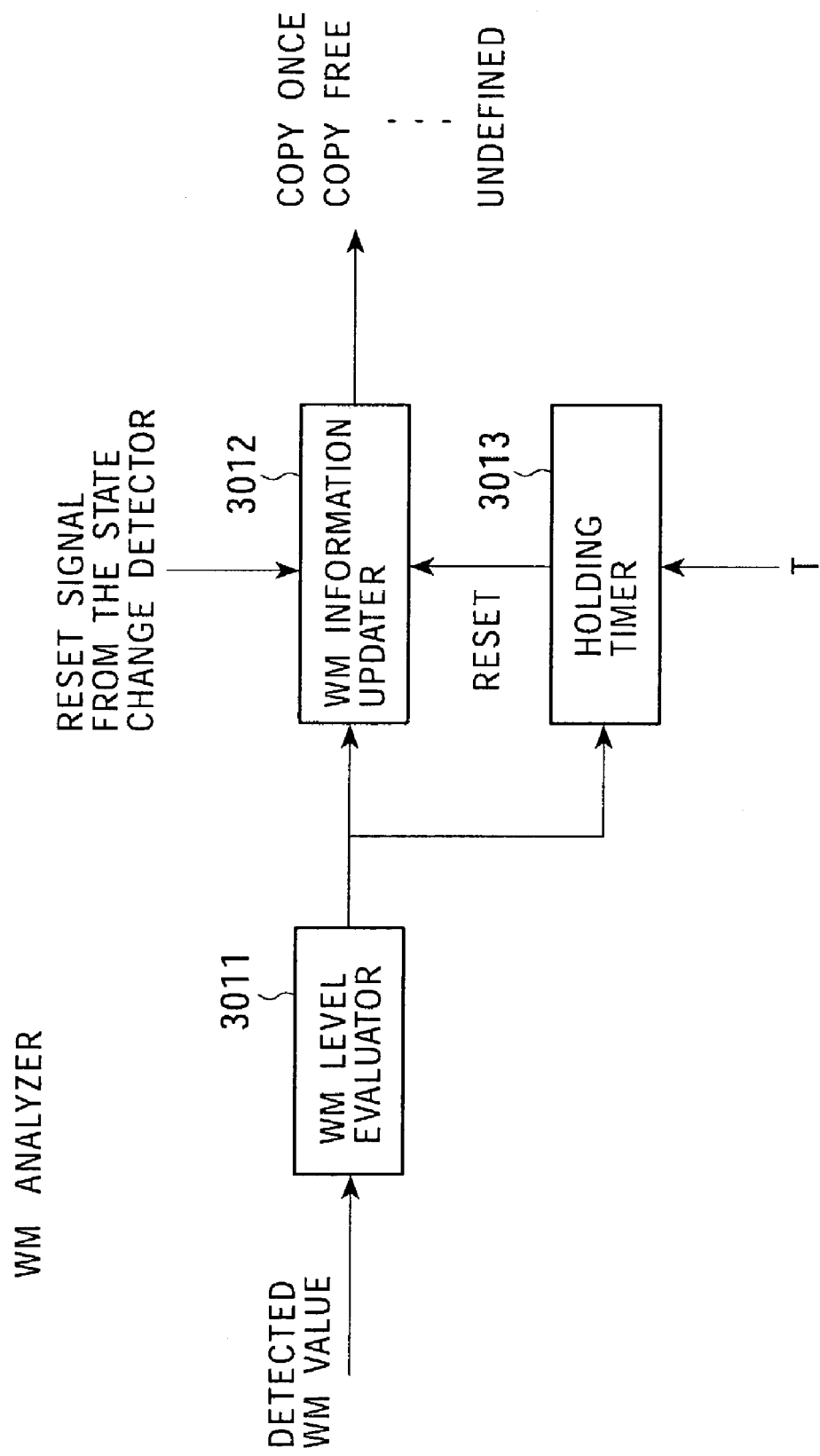
FIG. 6 is a block diagram showing a construction of a WM analyzer of the WM decoder shown in FIG. 5.

FIG. 6 shows a construction of the WM analyzer 1075. If the detected digital watermark information WM is supplied from the despreader 1074 to the WM analyzer 1075, a WM level evaluator 3011 in the WM analyzer 1075 evaluates the signal level of the detected digital watermark information WM. More specifically, the WM level evaluator 3011 compares with the detected signal level with a predetermined threshold (Th). If and only if the detected signal level is higher than the predetermined threshold (Th), the WM level evaluator 3011 determines that the copy control information acquired from the digital watermark information WM is valid, and the WM level evaluator 3011 requests a WM information updater 3012 to perform an updating process on the basis of the copy control information detected from the digital watermark information.

In a case in which the signal level of the detected digital watermark information WM supplied from the despreader 1074 to the WM analyzer 1075 is lower than the threshold (Th), the WM information updater 3012 holds the previously detected digital watermark information WM and outputs the digital watermark information WM to the controller 110 (FIG. 3) so that the copying control is continuously performed in accordance with the same digital watermark information WM.

The comparison of the signal level of the detected digital watermark information WM supplied from the despreader 1074 with the threshold (Th) may be performed by the WM level evaluator 3011 immediately when each digital watermark information WM is input to the despreader 1074. Alternatively, the detected signal level may be integrated over a predetermined period of time, and the resultant integral value may be compared with the threshold value. In the case in which the integral value is employed, the integral value is reset each time the comparison result is obtained. Furthermore, the resetting of the integral value may also be performed when the WM information updater 3012 resets the WM information.

A holding timer 3013 measures the time elapsed from a time at which the update request was output from the WM level evaluator 3011. If the WM level evaluator 3011 does not acquire next digital watermark information WM having a signal level higher than the threshold (Th) and does not output a new update request during a period of time with a predetermined length (T), the holding timer 3013 outputs a reset signal to the WM information updater 3012. If the WM information updater 3012 receives the reset signal from the holding timer 3013, the WM information updater 3012 resets the digital watermark information WM held therein and outputs "undefined" information indicating that the digital watermark information is in an "undefined" state to the controller 110.

As described earlier, when the digital watermark information is in the "undefined" state, the process may be performed in a similar manner as in the "Copy Free" mode, if there is any other copy control information that should be applied. However, if there is other copy control information (CGMS) as is the case in the present embodiment, that other copy control information may be applied.

In the present embodiment, in which both CGMS information and digital watermark information WM is added as copy control information, if the digital watermark signal level is not high enough and does not exceed the threshold (Th) over a continuous period equal to or longer than the predetermined time (T), and, as a result, copy control information detected from the digital watermark information WM is determined to be "undefined", the CGMS information may be directly applied as copy control information.

In the case in which the CGMS information is applied, the digital watermark information may be updated in accordance with the CGMS information. More specifically, in the case in which CGMS information of a received content has a value of "10" (Copy Once), and the CGMS information is rewritten into "11" (Never Copy) when the received content is recorded, the digital watermark information WM may be changed into "No More Copy" in response to the rewriting of the CGMS information.

However, because there is a possibility that CGMS information has been tampered with, it is desirable to verify the reliability of the CGMS information and perform the rewriting of digital watermark information WM in accordance with CGMS information be performed only when the reliability is determined to be high enough.

The evaluation of the reliability of CGMS information may be performed, for example, as follows. CGMS information and digital watermark information WM of a content received in a past period with a predetermined length of T1 are compared with each other. If these two pieces of copy control information are consistent with each other over a period of time with a length equal to or longer than T2 ($T2 \leq T1$) in the past period, then the CGMS information is determined to be high in reliability. However, if the period in which the two pieces of copy control information are consistent with each other is shorter than T2, the CGMS information is determined to be low in reliability.

The state change detector 1076 in the WM decoder 107 monitors the video data Di input to the state change detector 1076 to detect a change in content. If the state change detector 1076 detects a change in content, the state change detector 1076 outputs a reset signal to the WM information updater 3012 (FIG. 6) of the WM analyzer 1075, in accordance with the change in content.

The detection by the state change detector 1076 as to a content-to-content transition may be performed in many ways as described below.

(1) Luminance information of video data Di is monitored. If an abrupt change in luminance is detected at a point, that point is determined as a scene change point at which a content-to-content transition occurs. This method is called a scene change-based detection method.

(2) CGMS information of video data Di is monitored, and a point at which a change in CGMS information is detected is determined to be a point at which a content-to-content transition occurs. This method is called a CGMS-based detection method.

(3) A copy control flag (such as a digital copy control descriptor in SI (Service Information) included in a transport stream (TS) packet of digital data) or the like included in broadcast video data is monitored. If a change in flag is detected, it is determined that a content-to-content transition has occurred. This method is called a flag-based detection method.

(4) CA (Conditional Access) information or the like serving as a conditional access identifier included in broadcast video data is monitored. If a change in CA information is detected, it is determined that a content-to-content transition has occurred. This method is called a CA information-based detection method. CA information, as with the copy control flag described above, is included as a descriptor in service information (SI) included in a transport stream (TS) packet of digital data.

(5) Channel switching performed by a receiver is monitored. When a channel switching is detected, it is determined that a content-to-content transition has occurred. This method is called a channel switching-based detection method.

(6) Presence/absence of an input signal is monitored. When the input signal is changed from a "present" state to an "absent" state, from an "absent" state to a "present" state, or from a "present" state to an "absent" state and further to a "present" state, it is determined that a content-to-content transition has occurred. This method is called an input signal-based detection method.

The state change detector 1076 (FIG. 5) is constructed so as to be able to detect a state change by means of one of a combination of some of methods described above. If a state change corresponding to a content-to-content transition is detected, the state change detector 1076 outputs a reset signal (FIGS. 5 and 6) to the WM analyzer 1075.

As shown in FIG. 6, the reset signal output from the state change detector 1076 is input to the WM information updater 3012 of the WM analyzer 1075. If the WM information updater 3012 receives the reset signal from the state change detector 1076, the WM information updater 3012 resets copy control information held therein. When copy control information is output thereafter, "undefined" is output.

That is, during a period from a content-to-content transition to a time at which new copy control information is detected from digital watermark information, copy control is performed in the "undefined" mode.

As described earlier, when the digital watermark information WM is in the "undefined" state, the process may be performed in a similar manner as in the "Copy Free" mode, if there is any other copy control information that should be applied. However, in a case in which there is other copy control information (CGMS information) as is the case in the present embodiment, that copy control information (CGMS information) may be applied, if and only if that other copy control information (CGMS information) is determined to be reliable.

Figure 7:
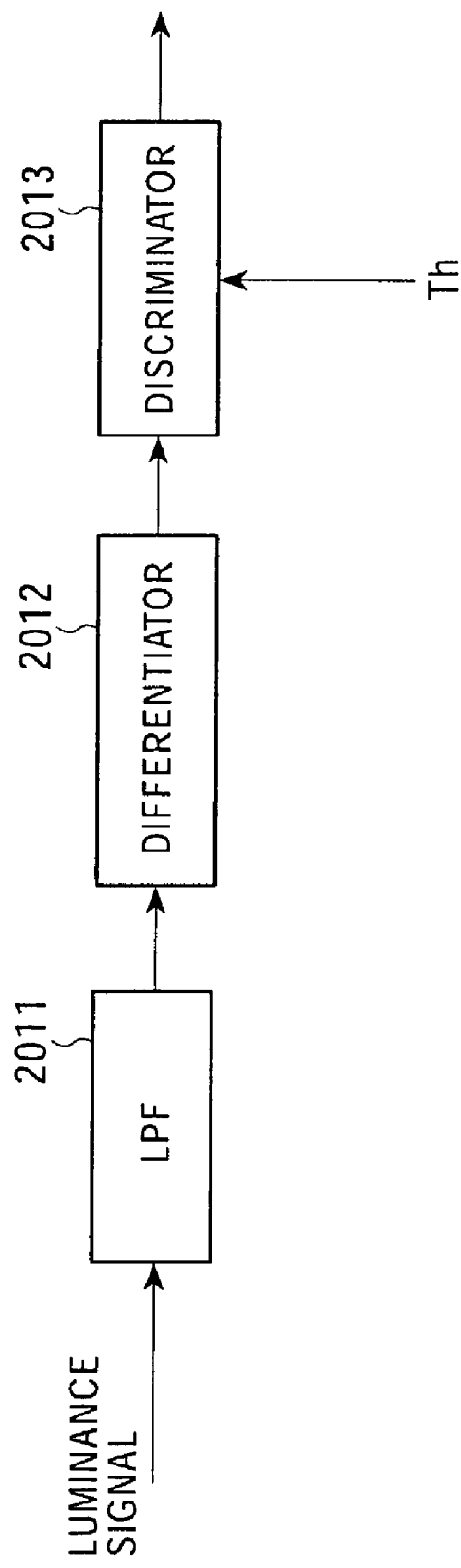
FIG. 7 is a block diagram showing an example of a construction of a state change detector of the WM decoder shown in FIG. 5.

As described earlier, the state change detector 1076 may detect a state change in many ways. For example, in the case in which the detection is performed according to the method (1) based on a change in luminance of video data, the state change detector 1076 may be constructed as shown in FIG. 7. In this case, a luminance component of input video data is passed through a lowpass filter 2011 and a differentiator 2012 thereby detecting a quantitative change in the luminance signal that may occur at a scene transition. The detected quantitative change is compared with a predetermined threshold (Th(luminance)). If the luminance change is greater than the threshold (Th(luminance)), it is determined that a content-to-content transition has occurred, and a reset signal is output to the WM analyzer 1075.

In the case in which the CGMS-based detection method (2) is employed, a CGMS signal detector is disposed in the state change detector 1076 or elsewhere in an apparatus. If a change in CGMS information is detected, a reset signal is output to the WM analyzer 1075.

In the case in which the detection is performed according to the method (3) based on a change in the copy control flag such as a digital control descriptor, or according to the method (4) based on a change in CA (Conditional Access) information, a copy control flag or CA (Conditional Access) information is acquired via transport stream (TS) processing means, and information indicating a change in the copy control flag or the CA information is input to the state change detector 1076. The state change detector 1076 generates a reset signal in accordance with the input information and supplies it to the WM analyzer 1075.

In the case in which the channel switching-based detection method (5) is employed, a channel switching signal is input to the state change detector 1076, and the state change detector 1076 generates a reset signal in accordance with the input information and supplies it to the WM analyzer 1075. In this case, it is not necessary to input video data Di to the state change detector 1076 as in the construction shown in FIG. 5, but the channel switching signal output from a user interface or a similar device is input to the state change detector 1076.

In the case in which the input signal-based detection method (6) is employed, a change in the input signal is detected by means of a construction similar to that employed in the detection technique (1) on the basis of a change in luminance of video data, and the state change detector 1076 generates a reset signal in response to the detection of a change and supplies it to the WM analyzer 1075.

The state change detector 1076 monitors a change in one of the states described above or changes of a plurality of states to detect a content-to-content transition. If a content-to-content transition is detected, the state change detector 1076 outputs a reset signal to the WM analyzer 1075.

Figure 8:
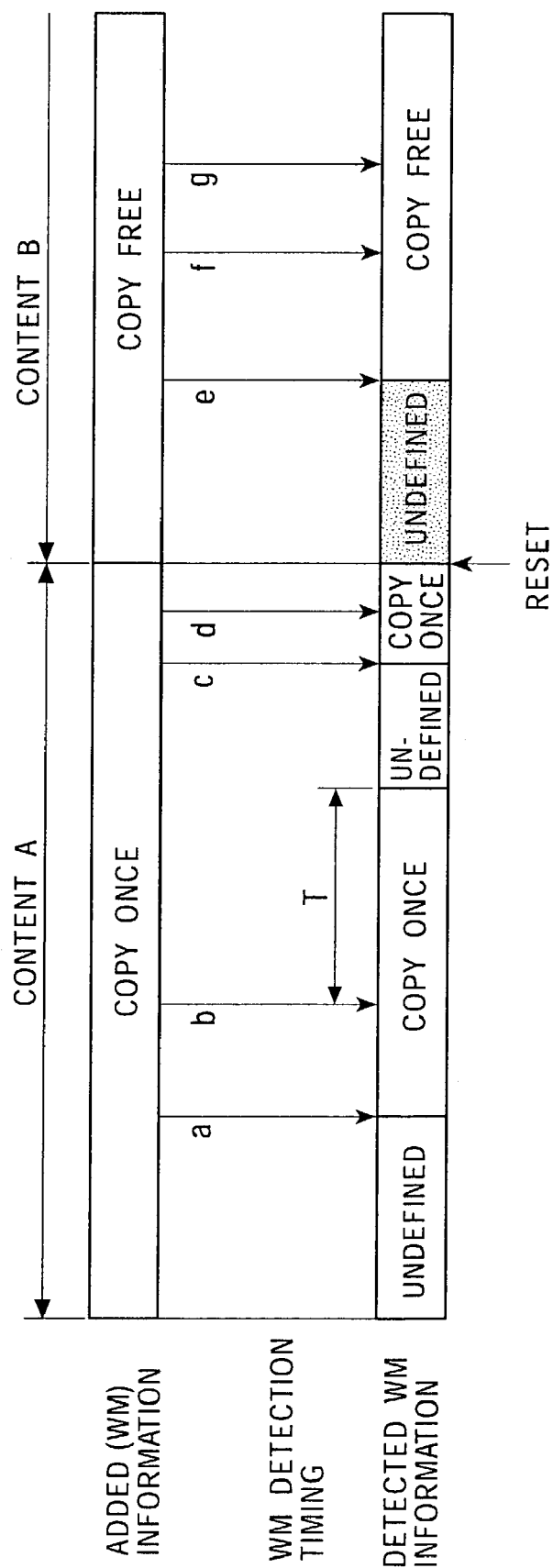
FIG. 8 is a diagram showing a copy control process performed when a content-to-content transition occurs, according to the present invention.

FIG. 8 shows a copy control process performed when a reset signal is output from the state change detector 1076. In this example shown in FIG. 8, a digital watermark is detected when digital data broadcasted from a station is received or the received digital data is recorded. In digital broadcasts provided by broadcasting stations, various programs are provided one after another, and various commercial messages provided by sponsors are inserted between programs. Thus, copyright of contents provided via broadcasting varies frequently and sequentially.

In FIG. 8, a digital watermark functioning as copy control information indicating that copying should be controlled in the Copy Once mode is embedded in a content provided during a period A, and a digital watermark functioning as copy control information indicating that copying should be controlled in the Copy Free mode is embedded in a content provided during a period B. In a receiver or a record/playback apparatus, a digital watermark is detected from a content and the content is recorded into a digital device.

Detection of a digital watermark from a content is performed repeatedly for each image frame. However, as described earlier, the levels of detected digital watermarks, that is, the detected levels, vary depending on the condition of the video data, and the digital watermarks cannot be accurately detected unless the detected levels are higher than a predetermined threshold (Th). Therefore, the digital watermarks are read only when the detected levels are higher than the threshold (Th). If a digital watermark includes copy control information, copying is controlled in accordance with the detected copy control information. More specifically, deciding whether to permit the operation of recording the content onto a recording medium is performed, and the copy control information is rewritten, for example, from Copy Once to No More Copy.

In FIG. 8, detection timing arrows (denoted by a, b, c, d, e, f, and g) indicate times at which digital watermarks having a level higher than the threshold (Th) is successfully detected. If a digital watermark is detected, the process performed thereafter obeys the detected information at least over a following period with a predetermined length (T). In the case of the content A, because the digital watermark including the copy control information indicating that copying should be controlled in the Copy Once mode is embedded in the content A, copying is controlled in accordance with the copy control information indicating that copying should be controlled in the Copy Once mode. If no digital watermark is detected in a period with the predetermined length (T), the detected information is determined to be "undefined", that is, the process is performed assuming that no control information is included in the content. In this case, the process may be performed in a similar manner as in the Copy Free mode, as described earlier. Alternatively, CGMS information may be applied if the CGMS information is sufficiently reliable.

In FIG. 8, at a time denoted by a detection timing arrow c, digital watermark information is detected from the content A, and the process is performed in accordance with the detected copy control information indicating Copy Once. Thereafter, at a time (denoted by an arrow d) within a following period of T, a digital watermark including copy control information indicating that copying should be controlled in the Copy Once mode is detected. After that, if the content is switched from A to B, this content-to-content transition is detected by the state change detector 1076, and a reset signal is output from the state change detector 1076 to the WM analyzer 1075.

In response to the reset signal received from the state change detector 1076, the WM analyzer 1075 resets the current copy control information held therein to the "undefined" state and outputs the copy control information in the "undefined" state. Thus, as shown in FIG. 8, in a period immediately after that the content A is switched to the content B, copy control is performed in the "undefined" mode until digital watermark information WM having a signal level higher than the threshold is detected next. More specifically, during this period, the copy control may be performed in a similar manner as in the Copy Free mode, or performed in accordance with CGMS information if the CGMS information is reliable.

Thereafter, if digital watermark information associated with the content B is detected at a detection timing (an arrow e), that is, if digital watermark information having a signal level higher than the threshold (Th) is input from the despreader 1074 (FIG. 5) to the WM analyzer 1075, an update request in accordance with copy control information included in newly detected digital watermark information WM is output to the WM information updater 3012 from the WM level evaluator 3011 of the WM analyzer 1075 shown in FIG. 6. In accordance with the update request, the WM information updater 3012 performs an updating process. In this specific case, because copy control information of Copy Free is added as digital watermark information to the content B, the Copy Free mode is applied in the process performed thereafter.

In the present embodiment, as described above, the state change detector 1076 monitors a content-to-content transition and outputs a reset signal to the WM analyzer when a content-to-content transition is detected, thereby resetting the current control mode. This prevents the copy control information included in a previous content from being incorrectly applied to a following content when a content-to-content transition occurs.

Figure 9:
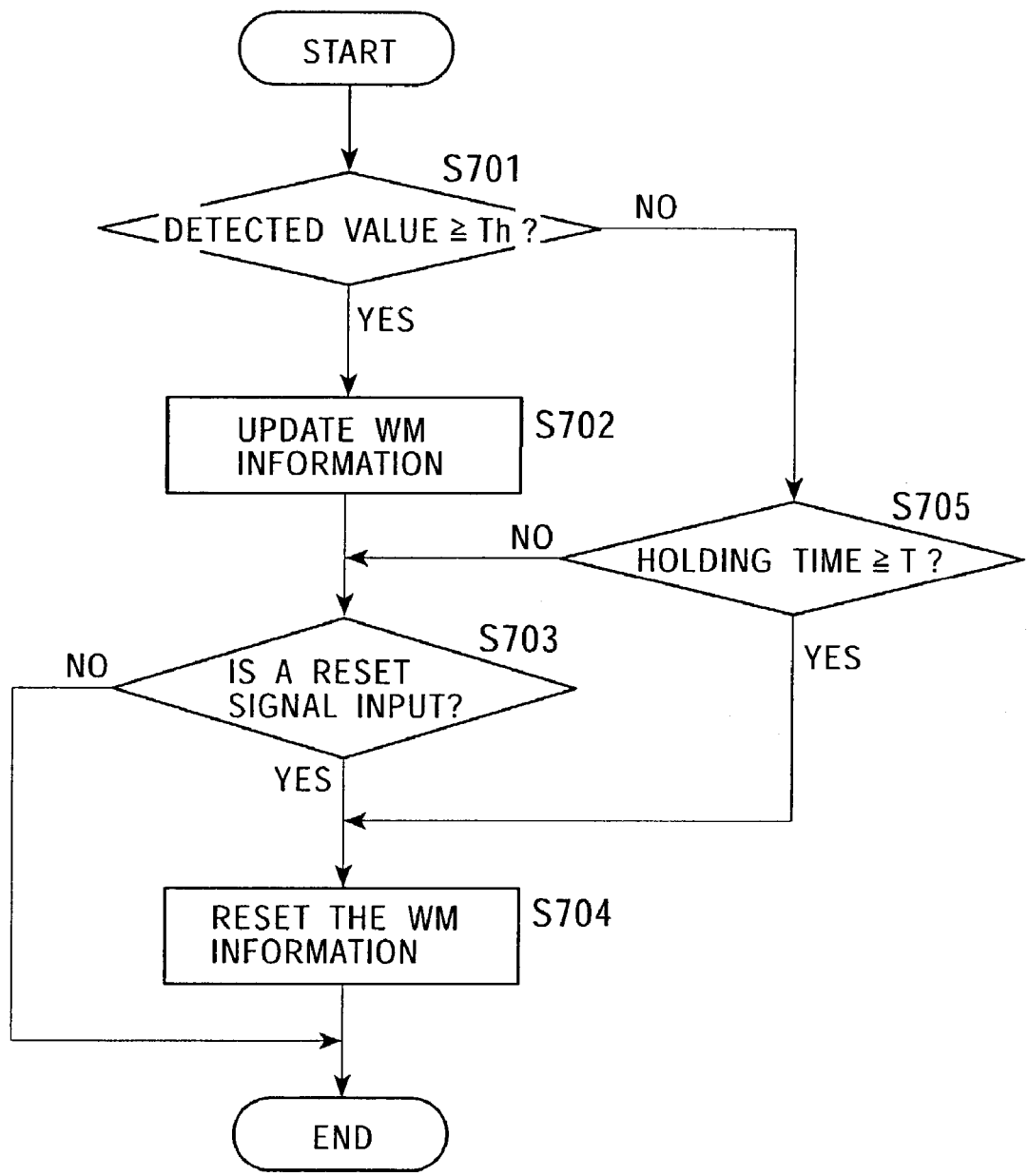
FIG. 9 is a flow chart showing a sequence of updating/resetting digital watermark information WM performed by the WM analyzer, according to the present invention.

FIG. 9 shows processing flows in a process of updating/resetting digital watermark information WM, performed by the WM analyzer 1075 according to the present invention.

The WM level evaluator 3011 (FIG. 6) of the WM analyzer compares the signal level of detected digital watermark information input from the despreader 1074 (FIG. 5) with the predetermined threshold (Th) (step S701). In this step, the signal level compared with the threshold (Th) may be an integral of detected digital watermark information, as described earlier. If the signal level of the detected digital watermark information is higher than the threshold (Th), the WM level evaluator 3011 outputs, to the WM information updater 3012, an update request in accordance with copy control information included in the detected digital watermark information WM. In accordance with the update request, the WM information updater 3012 updates the copy control information represented in digital watermark information WM (step S702).

On the other hand, if, in the comparison step (step S701) in which the signal level of the detected digital watermark information is compared with the predetermined threshold (Th), the signal level is determined to be lower than the threshold (Th), the holding timer measures the time elapsed since latest digital watermark information WM was detected, and determines whether the elapsed time has reached a holding time T (step S705).

After updating the copy control information in the digital watermark information WM in step S702, if the elapsed time has not reached the holding time T, the process proceeds to step S703 to determine whether a reset signal has been input. The reset signal detected in step S703 is that which is generated by the state change detector 1076 for detecting a content-to-content transition and is input to the WM analyzer 1075.

If it is determined in step S703 that the reset signal is input to the WM analyzer 1075 from the state change detector 1076, the copy control information represented in the digital watermark information WM that is held in the WM analyzer 1075 and has been applied as control information is reset to the "undefined" state. In a case in which it is determined in step S705 that the time elapsed since the latest digital watermark information WM was detected has reached the holding time T, the copy control information is also reset to the "undefined" state in step S704.

In a case in which digital watermark information WM has been successfully detected, the controller 110 rewrites, using the CGMS rewriter 104, the CGMS information in accordance with the copy control mode described in the digital watermark information WM detected by the WM analyzer 1075 described above, so that the CGMS information becomes consistent with the digital watermark information WM. More specifically, if the signal level of detected digital watermark information is higher than the threshold Th and the elapsed time is within the holding time T, the CGMS information is rewritten in accordance with the digital watermark information WM.

For example, when CGMS information associated with received video information has a value of "00" indicating that copying is freely permitted, if associated digital watermark information WM indicates that copying is permitted once (Copy Once), the CGMS information is rewritten into "10" to indicate that copying is permitted once.

In a case in which when CGMS information associated with received video information has a value of "00" or "10" indicating that copying is permitted freely or once, if associated digital watermark information WM indicates that no more copying is permitted (No More Copy) or copying is never permitted (Never Copy), the CGMS information is rewritten into "11".

However, in a case in which digital watermark information having a signal level higher than the threshold Th is not detected within a period of holding time T and digital watermark information is determined to be "undefined", or in a case in which the a content-to-content transition is detected by the state change detector 1076 and a reset signal is input to the WM analyzer 1075 whereby the digital watermark information is determined to be "undefined", rewriting of the CGMS information according to the digital watermark information WM is not performed.

In the present embodiment, because digital watermark information WM is highly reliable without being easily tampered with, CGMS information is rewritten, without checking the state of the CGMS information, in accordance with digital watermark information WM so that the CGMS information and the digital watermark information become consistent with each other, thereby making it possible to prevent the CGMS information and the digital watermark information from becoming inconsistent with each other and thus making it possible to correctly perform generation-based copy control.

Furthermore, a content-to-content transition occurs, a current content switched to from a previous content can be prevented from being erroneously subjected to copy control according to copy control information assigned to the previous content.

The compressed digital video data from the CGMS rewriter 104 is digitally output via an IEEE1394 interface bus. In this outputting process, as described earlier, the IEEE1394 secure bus prevents the data from being fraudulently copied.

More specifically, the data output from the CGMS rewriter 104 is supplied to an encryptor 108, and the encryptor 108 encrypts the received video data in the compressed form, under the control of the controller 110, by using an encryption key that is changed from communication to communication. This encryption process performed by the encryptor 108 is based on an encryption method different from the method employed to encrypt an information signal recorded on a RAM disk or a ROM disk.

The encrypted data output from the encryptor 108 is supplied to a destination electronic device via an IEEE1394 interface 109 and further via an output terminal 111b. In this process, the IEEE1394 interface 109 output the data after converting it into a form which satisfies the IEEE1394 interface specifications.

Furthermore, in this process, the controller 110 communicates with the destination device via the IEEE1394 interface 109 to determine whether the destination device is a compliant device. If the destination device is a compliant device, the controller 110 further determines whether the destination device is a recording apparatus.

Thereafter, the controller 110 determines whether decryption key information necessary to decrypt the encryption performed by the encryptor 108 should be transmitted to the destination device, on the basis of, in this specific embodiment, the copy control information decoded by the WM decoder 107 and the type of the destination device indicated by information given through the IEEE1394 interface 109. In a case in which plural pieces of copy control information are output from the WM decoder 107, the controller 110 employs copy control information having a control mode closest to the Never Copy mode.

In a case in which the destination device is a non-compliant apparatus, the decryption key information is not transmitted to the destination device. Even when the destination device is a compliant apparatus, if the destination device is a recording apparatus and if the "No More Copy" or "Never Copy" mode is designated by the digital watermark information WM, the decryption key information is not transmitted to the destination device.

As described above, the IEEE1394 interface may determine whether to transmit the decryption key to the destination device, on the basis of CGMS information rewritten by the CGMS rewriter 104. In this case, when the destination device is a compliant recording apparatus, if the CGMS information has a value of "11", the decryption key information is not transmitted to the destination device.

As for the analog video signal output from the D/A converter 105, CGMS-A information may be added thereto in accordance with digital watermark information WM. More specifically, the CGMS-A information is described by 2 bits of a total of 20 bits of additional information superimposed on a luminance signal of a video signal in a specific horizontal interval within a vertical blanking period. In the case of a NTSC video signal, the specific horizontal interval described above is the 20th effective horizontal interval.

As described above, because a video signal is output from the set-top box 100 after CGMS information is rewritten in accordance with digital watermark information WM that is highly reliable without being easily tampered with so that the CGMS information and the digital watermark information become consistent with each other, generation-based copy control can be correctly performed even by an apparatus that uses only CGMS information.

A decoder for decoding CGMS information added to received video data may be provided, and, if comparison between the digital watermark information WM decoded by the WM decoder 107 and the CGMS information decoded by the CGMS decoder indicates that the copy control mode designated by the CGMS information is closer to the Never Copy mode, the CGMS information may not be rewritten. Of course, if there is no inconsistency between the CGMS information and the digital watermark information WM, the CGMS information may not be rewritten.

[Compliant Recording Apparatus]

Figure 10:
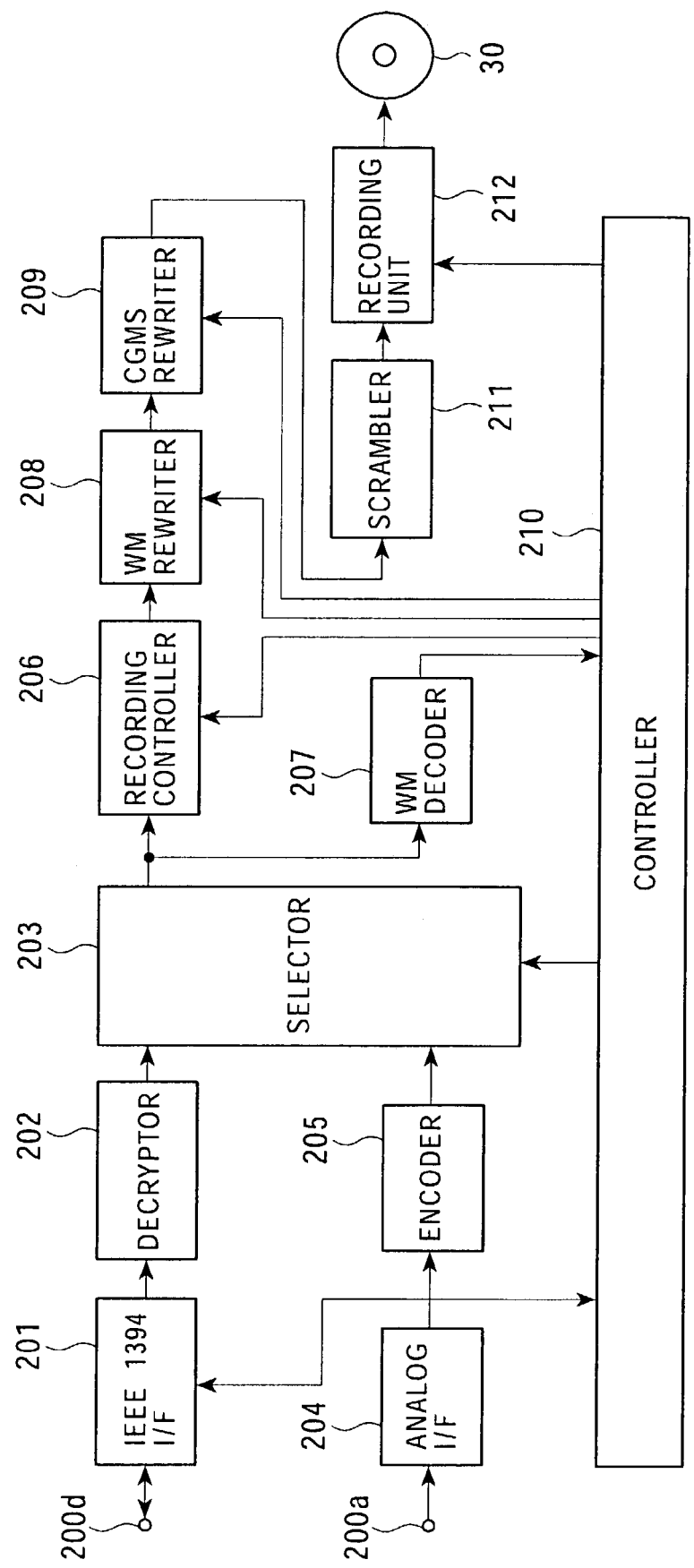
FIG. 10 is a block diagram showing an example of a construction of an information signal recording apparatus according to an embodiment of the present invention.

The compliant recording apparatus 200 is described below. FIG. 10 is a block diagram showing an example of a construction of the compliant recording apparatus 200.

As shown in FIG. 10, the compliant recording apparatus 200 includes a digital input terminal 200d for an IEEE1394 interface, and an analog input terminal 200a. The digital input terminal 200d is connected to an IEEE1394 interface 201. The IEEE1394 interface 201 serves to re-convert data, which has been converted to satisfy the IEEE1394 bus interface standard, into the original form.

The data output from the IEEE1394 interface 201 is supplied to a decryptor 202. As described earlier, in a case in which an apparatus connected to the digital input terminal 200d determines that an information signal is permitted to be copied, decryption key information needed to decrypt the encrypted information signal is transmitted from the apparatus. If the decryptor 202 acquires the decryption key information, it becomes possible to decrypt the encrypted data received from the IEEE1394 interface 201 into original compressed video data. The decrypted video data in the compressed form is supplied to a selector 203.

The analog video information input via the analog input terminal 200a is supplied to a compression encoder 205 via an analog interface 204. After the analog video information is MPEG-compressed by the compression encoder 205, the resultant video information is supplied to the selector 203.

The selector 203 selects either the data output from the decryptor 202 or the data output from the encoder 205 in accordance with a selector control signal generated in response to an input selection operation performed by a user. The selected data is output from the selector 203.

The data output from the selector 203 is supplied to a recording controller 206 and also to a WM decoder 207. The WM decoder 207 extracts digital watermark information WM and analyzes it. The analysis result as to the digital watermark information WM is supplied to the controller 210.

On the basis of the received analysis result of the digital watermark information WM, the controller 210 determines whether the input information is permitted to be recorded (copied). If recording (copying) is permitted, the controller 210 further determines whether it is needed to rewrite CGMS information or digital watermark information serving as copy control information.

That is, in the case in which the controller 210 determines, on the basis of the digital watermark information WM, that recording is prohibited, the controller 210 controls the recording controller 206 and the recording unit 212 such that recording is not performed.

When the digital watermark information WM indicates that copying is freely permitted (in the Copy Free mode) or when the digital watermark information WM is "undefined", the controller 210 controls the recording controller 206 and the recording unit 212 such that recording becomes possible. In this case, although the compressed digital video data output from the recording controller 206 is passed through the WM rewriter 208 and the CGMS rewriter 209, the digital watermark information WM and the CGMS information are not rewritten. The compressed digital video data output from the CGMS rewriter 209 is supplied to a scrambler 211.

The scrambler 211 scrambles the received video data according to a method different from the CSS or the encryption performed by the IEEE1394 interface. The scrambled video data is recorded by the recording unit 212 onto a RAM disk 30.

In the case in which the digital watermark information WM indicates that copying is permitted in the Copy Once mode, the controller 210 controls the recording controller 206 and the recording unit 212 to record the video data. In this case, the digital watermark information WM is rewritten by the WM rewriter 208 into No More Copy (actually, information indicating that no more copying is permitted is superimposed on existing information), and the CGMS information is rewritten by the CGMS rewriter 209 into "11" so as to indicate that no more copying is permitted.

After the digital watermark information WM and the CGMS information were rewritten, the resultant compressed digital video data is scrambled by the scrambler 211 and recorded by the recording unit 212 onto the RAM disk 30.

Because CGMS information is described by 2-bit data placed at a specific location in a data stream of video data, the above rewriting process by the CGMS rewriter 209 may be performed such that the 2-bit data at the specific location in the data stream is extracted and rewritten into "11".

Figure 11:
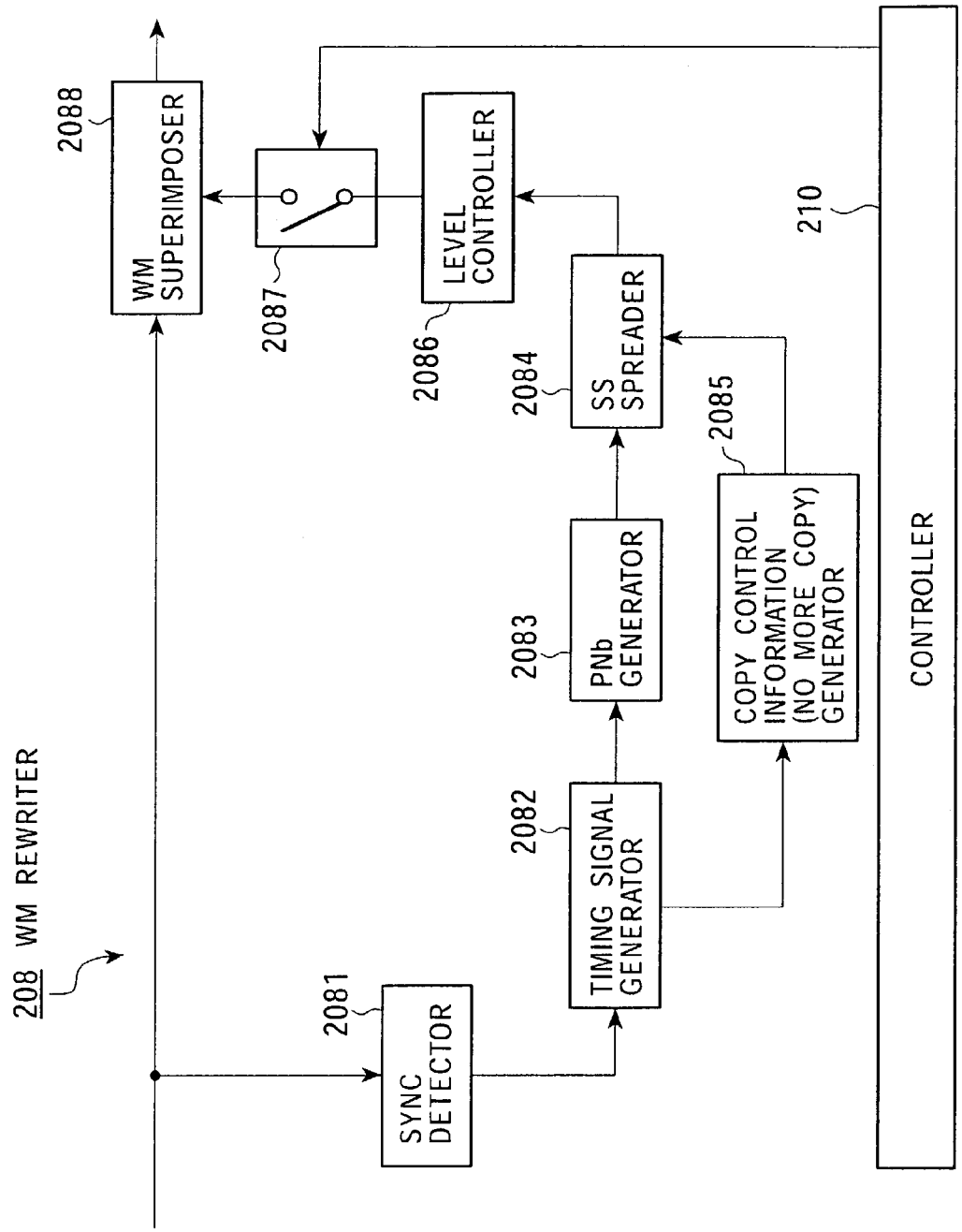
FIG. 11 is a block diagram showing an example of a construction of a WM rewriter that is a part of the recording apparatus shown in FIG. 10.

On the other hand, because digital watermark information WM is modulated by means of spread spectrum technique as described earlier, the digital watermark information WM rewriter 208 superimposes a new spread-spectrum signal on the existing signal. FIG. 11 shows an example of a construction of the digital watermark information WM rewriter 208. This construction is similar to that shown in FIG. 3 except for a digital watermark information superimposer and some other differences.

That is, in FIG. 11, a sync detector 2081, a timing signal generator 2082, an SS spreader 2084, a level controller 2086, and a WM superimposer 2088 are respectively similar to the sync detector 41, the timing signal generator 42, the SS spreader 44, the level controller 46, and the WM superimposer 47.

A first difference of the digital watermark information superimposer from that shown in FIG. 3 is in that a switching circuit 2087 is disposed between the WM superimposer 2088 and the level controller 2086, wherein only when the controller 210 determines to perform recording and rewriting, the switching circuit 2087 is turned on in response to a switching control signal output from the controller 210.

A second difference from the digital watermark information superimposer shown in FIG. 3 is in that a different PN code series is used in the spread spectrum modulation process. More specifically, the PNa generator 43 in FIG. 3 is replaced with a PNb generator 2083 which generates a code series PNb different from the code series PNa.

A third difference from the digital watermark information superimposer shown in FIG. 3 is in that a copy control information generator 2085, unlike the copy control information generator 45 shown in FIG. 3, generates only copy control information designating the "No More Copy" mode.

Figure 12:
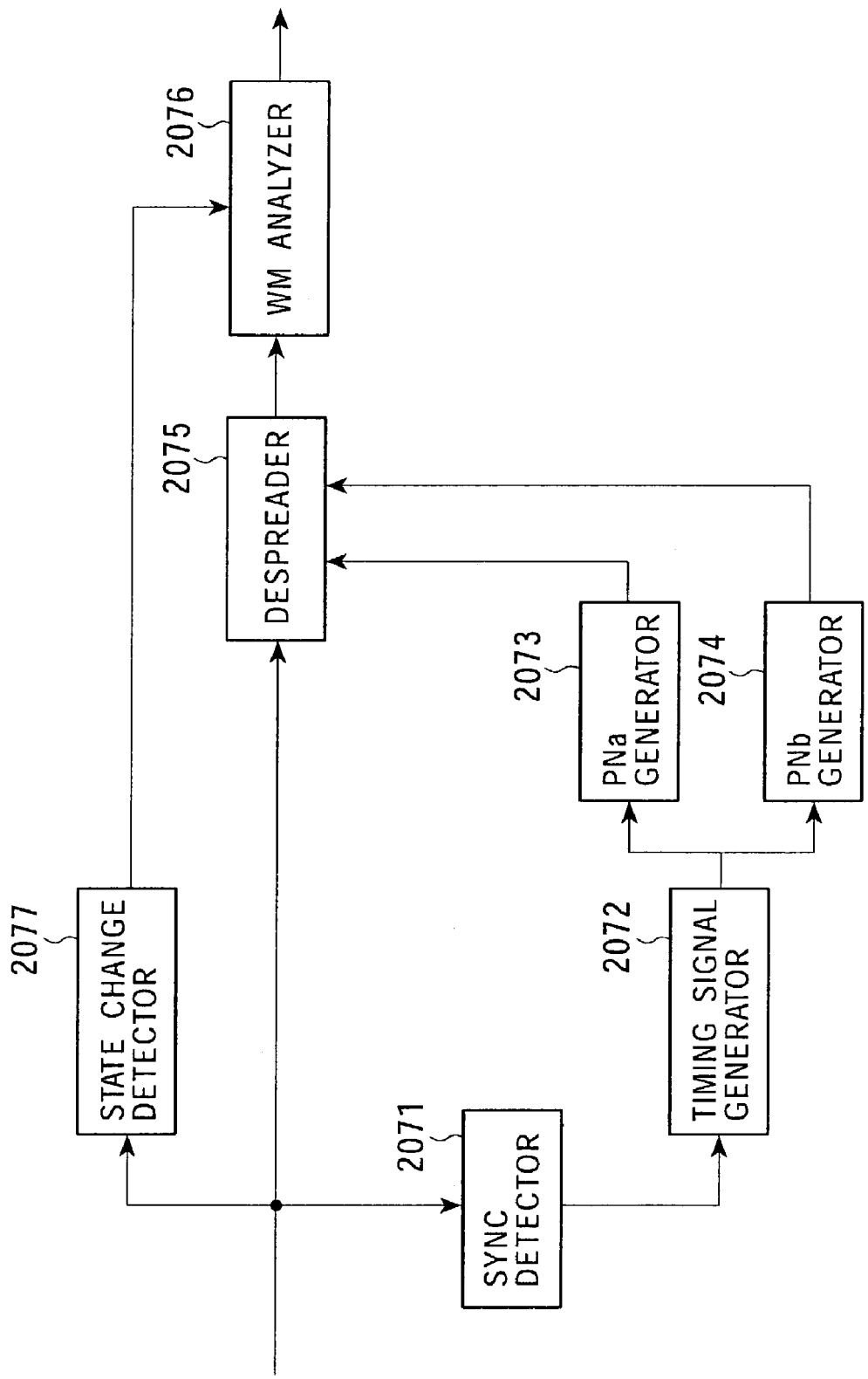
FIG. 12 is a block diagram showing an example of a construction of a WM decoder that is a part of the recording apparatus shown in FIG. 10.

The WM decoder 207 for decoding digital watermark information WM may be constructed as follows. FIG. 12 is a block diagram showing an example of the construction of the WM decoder 207. As shown in FIG. 12, the WM decoder 207 includes a sync detector 2071, a timing signal generator 2072, a PNa generator 2073, a PNb generator 2074, a despreader 2075, a WM analyzer 2076, and a state change detector 2077. The state change detector 2077 detects a content-to-content transition timing and outputs timing information to the WM analyzer 2076. As can be clearly seen from comparison with the construction shown in FIG. 5, the WM decoder 207 is different from that shown in FIG. 5 in that it includes the PNb generator 2074 in addition to the PNa generator 2073.

The PNb generator 2074 is provided in the WM decoder 207 to deal with a case in which video data recorded on a RAM disk 30 by the recording apparatus 200 is played back by a compliant playback apparatus and is again input to the compliant recording apparatus 200.

In the WM decoder 207, the despreader 2075 detects on or two pieces of copy control information by means of despreading using the two code series PNa and PNb and supplies the detected one or two pieces of copy control information to the WM analyzer 2076. The WM analyzer 2076 employs copy control information closer to the Never Copy mode.

Figure 13:
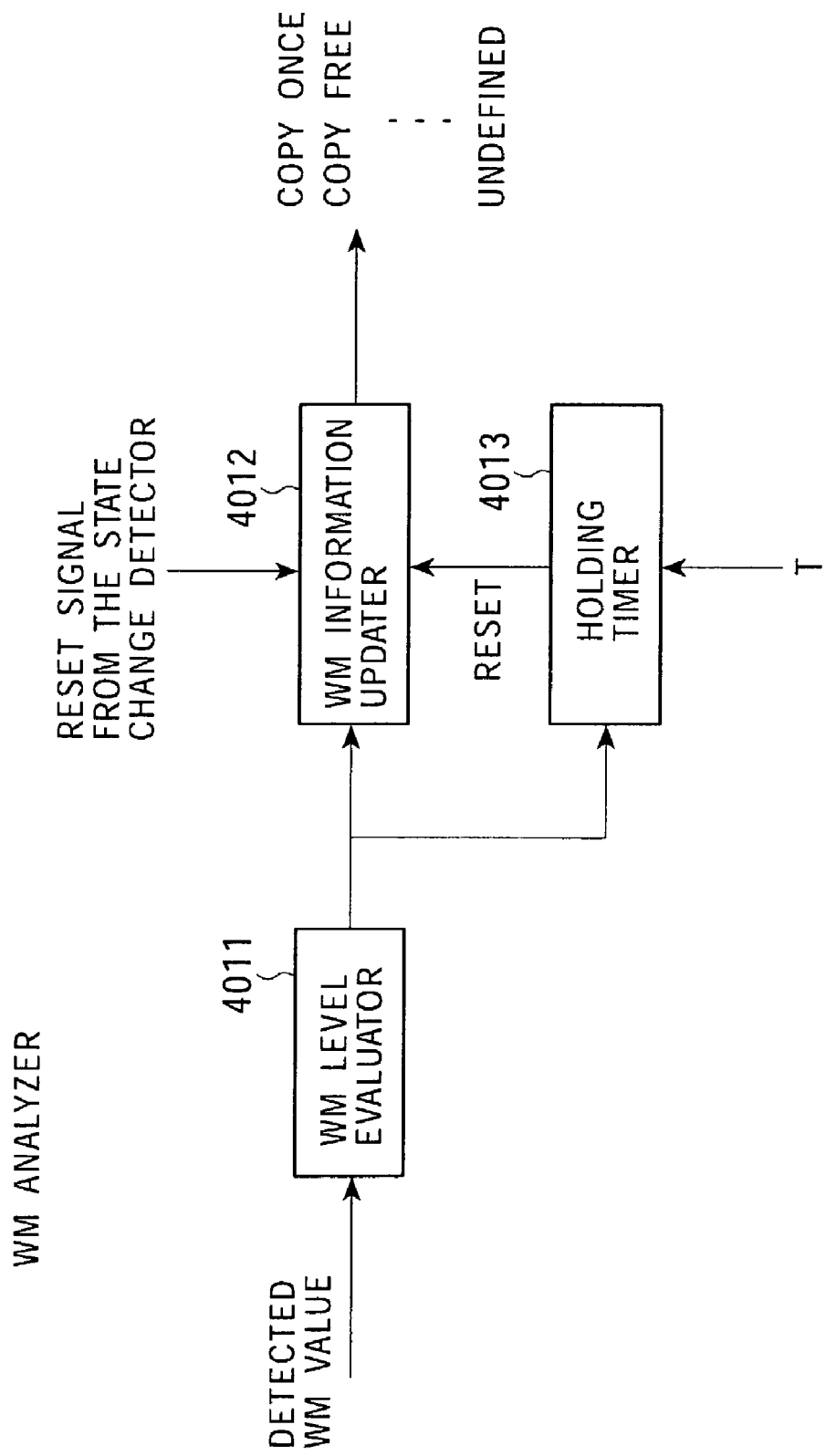
FIG. 13 is a block diagram showing an example of a WM analyzer that is a part of the WM decoder shown in FIG. 12.

The construction of the WM analyzer 2076 is shown in FIG. 13. When digital watermark information WM is input to the WM analyzer 2076 from the despreader 2075, a WM level evaluator 4011 in the WM analyzer 2075 evaluates the signal level of the digital watermark information WM and selects copy control information indicating a copy control mode closer to the never copy mode from the two pieces of copy control information generated by means of despreading using the two PN code series PNa and PNb. The selected copy control information is output from the WM level evaluator 4011. More specifically, the WM level evaluator 4011 compares with the detected signal level with a predetermined threshold (Th). If and only if the detected signal level is higher than the predetermined threshold (Th), the WM level evaluator 4011 determines that the copy control information acquired from the digital watermark information WM is valid, and the WM level evaluator 4011 selects copy control information indicating a copy control mode closer to the never copy mode from the two valid pieces of copy control information generated by means of despreading using the two PN code series PNa and PNb. The WM level evaluator 4011 then outputs an update request to the WM information updater 4012.

In the case in which the signal level of the detected digital watermark information WM input to the WM analyzer 2076 from the despreader 2075 is lower than the threshold (Th), the WM information updater 4012 holds the previous digital watermark information WM and outputs the digital watermark information WM to the controller 210 (FIG. 10) so that the copying control is continuously performed in accordance with the same digital watermark information WM.

The comparison of the signal level of the detected digital watermark information WM supplied from the despreader 2075 with the threshold (Th) may be performed by the WM level evaluator 4011 immediately when each digital watermark information WM is input to the despreader 2075. Alternatively, the detected signal level may be integrated over a predetermined period of time, and the resultant integral value may be compared with the threshold value. In the case in which the integral value is employed, the integral value is reset each time the comparison result is obtained. Furthermore, the resetting of the integral value may also be performed when the WM information updater 4012 resets the WM information.

A holding timer 4013 measures the time elapsed from a time at which the update request was output from the WM level evaluator 4011. If the WM level evaluator 4011 does not acquire next digital watermark information WM having a signal level higher than the threshold (Th) and does not output a new update request during a period of time with a predetermined length (T), the holding timer 4013 outputs a reset signal to the WM information updater 4012. If the WM information updater 4012 receives the reset signal from the holding timer 4013, the WM information updater 4012 resets the digital watermark information WM held therein and outputs "undefined" information indicating that the digital watermark information is in an "undefined" state to the controller 210.

As described earlier, when the digital watermark information is in the "undefined" state, the process may be performed in a similar manner as in the "Copy Free" mode, if there is any other copy control information that should be applied. However, if there is other copy control information (CGMS) as is the case in the present embodiment, that other copy control information may be applied.

In a case in which both CGMS information and digital watermark information WM is added as copy control information, if the digital watermark signal level is not high enough and does not exceed the threshold (Th) over a continuous period equal to or longer than the predetermined time (T), and, as a result, copy control information detected from the digital watermark information WM is determined to be "undefined", the CGMS information may be directly applied as copy control information.

In the case in which the CGMS information is applied, the digital watermark information may be rewritten by the WM rewriter 208 in accordance with the CGMS information. More specifically, in the case in which CGMS information of a received content has a value of "10" (Copy Once), and the CGMS information is rewritten into "11" (Never Copy) when the received content is recorded, the digital watermark information WM may be rewritten into "No More Copy" in response to the rewriting of the CGMS information.

However, because there is a possibility that CGMS information has been tampered with, it is desirable to verify the reliability of the CGMS information and perform the rewriting of digital watermark information WM in accordance with CGMS information be performed only when the reliability is determined to be high enough.

More specifically, for example, storage means for storing history information of the CGMS information and the digital watermark information Wm and comparison means for time-sequentially comparing the CGMS information and the digital watermark information WM to check the consistency between them are disposed in the WM decoder 207 or the WM rewriter 208 or elsewhere, whereby the reliability of the CGMS information is evaluated. For example, CGMS information and digital watermark information WM of a content received in a past period with a predetermined length of T1 are compared with each other. If these two pieces of copy control information are consistent with each other over a period of time with a length equal to or longer than T2 (T2≦T1) in the past period, then the CGMS information is determined to be high in reliability. However, if the period in which the two pieces of copy control information are consistent with each other is shorter than T2, the CGMS information is determined to be low in reliability.

The state change detector 2077 in the WM decoder 207 monitors the video data input to the state change detector 2077 to detect a change in content. If the state change detector 2077 detects a change in content, the state change detector 2077 outputs a reset signal to the WM information updater 4012 (FIG. 13) of the WM analyzer 2076, in accordance with the change in content.

The detection by the state change detector 2077 as to a content-to-content transition may be performed in many ways as described below.

(1) Luminance information of video data Di is monitored. If an abrupt change in luminance is detected at a point, that point is determined as a scene change point at which a content-to-content transition occurs. This method is called a scene change-based detection method.

(2) CGMS information of video data Di is monitored, and a point at which a change in CGMS information is detected is determined to be a point at which a content-to-content transition occurs. This method is called a CGMS-based detection method.

(3) A copy control flag (such as a digital copy control descriptor in SI (Service Information) included in a transport stream (TS) packet of digital data) or the like included in broadcast video data is monitored. If a change in flag is detected, it is determined that a content-to-content transition has occurred. This method is called a flag-based detection method.

(4) CA (Conditional Access) information or the like serving as a conditional access identifier included in broadcast video data is monitored. If a change in CA information is detected, it is determined that a content-to-content transition has occurred. This method is called a CA information-based detection method. CA information, as with the copy control flag described above, is included as a descriptor in service information (SI) included in a transport stream (TS) packet of digital data.

(5) Channel switching performed by a receiver is monitored. When a channel switching is detected, it is determined that a content-to-content transition has occurred. This method is called a channel switching-based detection method.

(6) Presence/absence of an input signal is monitored. When the input signal is changed from a "present" state to an "absent" state, from an "absent" state to a "present" state, or from a "present" state to an "absent" state and further to a "present" state, it is determined that a content-to-content transition has occurred.

The state change detector 2077 (FIG. 12) is constructed so as to be able to detect a state change by means of one of a combination of some of methods described above. If a state change corresponding to a content-to-content transition is detected, the state change detector 2077 outputs a reset signal (FIGS. 12 and 13) to the WM analyzer 2076.

As shown in FIG. 13, the reset signal output from the state change detector 2077 is input to the WM information updater 4012 of the WM analyzer 2076. If the WM information updater 4012 receives the reset signal from the state change detector 2077, the WM information updater 4012 resets copy control information held therein. When copy control information is output thereafter, "undefined" is output.

That is, during a period from a content-to-content transition to a time at which new copy control information is detected from digital watermark information, copy control is performed in the "undefined" mode.

As described earlier, when the digital watermark information is in the "undefined" state, the process may be performed in a similar manner as in the "Copy Free" mode, if there is any other copy control information that should be applied. However, in a case in which there is other copy control information (CGMS information) as is the case in the present embodiment, that copy control information (CGMS information) may be applied, if and only if that other copy control information (CGMS information) is determined to be reliable.

As described earlier, the state change detector 2077 may detect a state change in many ways. For example, in the case in which the detection is performed according to the method (1) based on a change in luminance of video data, the state change detector 2077 may be constructed as shown in FIG. 7. In this case, a luminance component of input video data is passed through a lowpass filter 2011 and a differentiator 2012 thereby detecting a quantitative change in the luminance signal that may occur at a scene transition. The detected quantitative change is compared with a predetermined threshold (Th(luminance)). If the luminance change is greater than the threshold (Th(luminance)), it is determined that a content-to-content transition has occurred, and a reset signal is output to the WM analyzer 2076.

In the case in which the CGMS-based detection method (2) is employed, a CGMS signal detector is disposed in the state change detector 2077 or elsewhere in an apparatus. If a change in CGMS information is detected, a reset signal is output to the WM analyzer 2076.

In the case in which the detection is performed according to the method (3) based on a change in the copy control flag such as a digital control descriptor, or according to the method (4) based on a change in CA (Conditional Access) information, a copy control flag or CA (Conditional Access) information is acquired via transport stream (TS) processing means, and information indicating a change in the copy control flag or the CA information is input to the state change detector 2077. The state change detector 2077 generates a reset signal in accordance with the input information and supplies it to the WM analyzer 2076.

In the case in which the channel switching-based detection method (5) is employed, a channel switching signal is input to the state change detector 2077, and the state change detector 2077 generates a reset signal in accordance with the input information and supplies it to the WM analyzer 2076. In this case, it is not necessarily needed to input video data Di to the state change detector 2077 as in the construction shown in FIG. 12, but the channel switching signal output from a user interface or a similar device is input to the state change detector 2077.

In the case in which the input signal-based detection method (6) is employed, a change in the input signal is detected by means of a construction similar to that employed in the detection technique (1) on the basis of a change in luminance of video data, and the state change detector 2077 generates a reset signal in response to the detection of a change and supplies it to the WM analyzer 2076.

The state change detector 2077 monitors a change in one of the states described above or changes of a plurality of states to detect a content-to-content transition. If a content-to-content transition is detected, the state change detector 2077 outputs a reset signal to the WM analyzer 2076.

The copy control process performed when a reset signal is output from the state change detector 2077 is similar to that described above with reference to FIG. 8. In the example shown in FIG. 8, a digital watermark functioning as copy control information indicating that copying should be controlled in the Copy Once mode is embedded in a content provided during a period A, and a digital watermark functioning as copy control information indicating that copying is permitted in the Copy Free mode is embedded in a content provided during a period B.

Detection of a digital watermark from a content is performed repeatedly for each image frame. However, as described earlier, the levels of detected digital watermarks, that is, the detected levels, vary depending on the condition of the video data, and the digital watermarks cannot be accurately detected unless the detected levels are higher than a predetermined threshold (Th). Therefore, the digital watermarks are read only when the detected levels are higher than the threshold (Th). If a digital watermark includes copy control information, copying is controlled in accordance with the detected copy control information. More specifically, decision as to whether recording on a recording medium should be permitted or prohibited is made in accordance with the control information, and the copy control information is rewritten from Copy Once to No More Copy.

In FIG. 8, detection timing arrows (denoted by a, b, c, d, e, f, and g) indicate times at which digital watermarks having a level higher than the threshold (Th) is successfully detected. If a digital watermark is detected, the process performed thereafter obeys the detected information at least over a following period with a predetermined length (T). In the case of the content A, because the digital watermark including the copy control information indicating that copying should be controlled in the Copy Once mode is embedded in the content A, copying is controlled in accordance with the copy control information indicating that copying should be controlled in the Copy Once mode. If no digital watermark is detected in a period with the predetermined length (T), the detected information is determined to be "undefined", that is, the process is performed assuming that no control information is included in the content. In this case, the process may be performed in a similar manner as in the Copy Free mode, as described earlier. Alternatively, CGMS information may be applied if the CGMS information is sufficiently reliable.

In FIG. 8, at a time denoted by a detection timing arrow c, digital watermark information is detected from the content A, and the process is performed in accordance with the detected copy control information indicating Copy Once. Thereafter, at a time (denoted by an arrow d) within a following period of T, a digital watermark including copy control information indicating that copying should be controlled in the Copy Once mode is detected. After that, if the content is switched from A to B, this content-to-content transition is detected by the state change detector 2077, and a reset signal is output from the state change detector 2077 to the WM analyzer 2076.

In response to the reset signal received from the state change detector 2077, the WM analyzer 2076 resets the current copy control information held therein to the "undefined" state and outputs the copy control information in the "undefined" state. Thus, as shown in FIG. 8, in a period immediately after that the content A is switched to the content B, copy control is performed in the "undefined" mode until digital watermark information WM having a signal level higher than the threshold is detected next. More specifically, during this period, the copy control may be performed in a similar manner as in the Copy Free mode, or performed in accordance with CGMS information if the CCMS information is reliable.

Thereafter, if digital watermark information associated with the content B is detected at a detection timing (an arrow e), that is, if digital watermark information having a signal level higher than the threshold (Th) is input from the despreader 2075 (FIG. 12) to the WM analyzer 2076, an update request in accordance with copy control information included in newly detected digital watermark information WM is output to the WM information updater 4012 from the WM level evaluator 4011 of the WM analyzer shown in FIG. 13. In accordance with the update request, the WM information updater 4012 performs an updating process. In this specific case, because copy control information of Copy Free is added as digital watermark information to the content B, the Copy Free mode is applied in the process performed thereafter.

In the present embodiment, as described above, the state change detector 2077 monitors a content-to-content transition and outputs a reset signal to the WM analyzer when a content-to-content transition is detected, thereby resetting the current control mode. This prevents the copy control information included in a previous content from being incorrectly applied to a following content when a content-to-content transition occurs.

Figure 14:
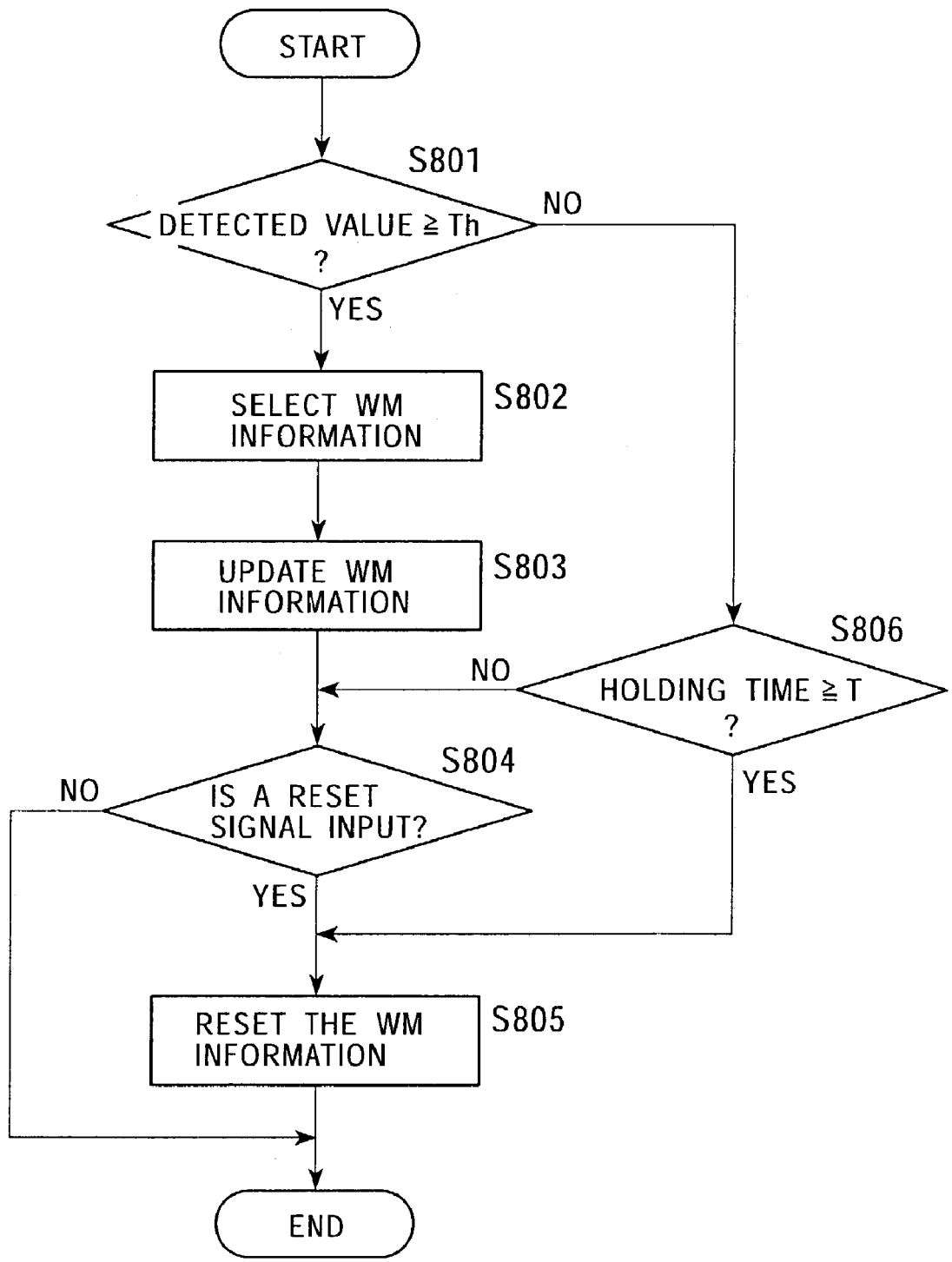
FIG. 14 is a flow chart showing a sequence of updating/resetting digital watermark information WM performed by the WM analyzer, according to the present invention.

FIG. 14 shows processing flows in a process of updating/resetting digital watermark information WM, performed by the WM analyzer 2076 according to the present embodiment.

The WM level evaluator 4011 (FIG. 13) of the WM analyzer compares the signal level of detected digital watermark information input from the despreader 2075 (FIG. 12) with the predetermined threshold (Th) (step S801). In this step, the signal level compared with the threshold (Th) may be an integral of detected digital watermark information, as described earlier. If the signal level of the detected digital watermark information is higher than the threshold (Th), the WM level evaluator 4011 outputs, to the WM information updater 4012, an update request in accordance with copy control information included in the detected digital watermark information WM. In accordance with the update request, the WM information updater 4012 updates the copy control information represented in digital watermark information WM (step S803).

Because one or two pieces of copy control information are generated by the despreader 2075 in the WM decoder 207 by means of despreading using the two PN code series PNa and PNb, the WM level evaluator 4011 selects a piece of copy control information indicating a copy control mode closer to the never copy mode of the two pieces of copy control information and outputs an update request, in accordance with the selected copy control information, to the WM information updater 4012 (step S802).

On the other hand, if, in the comparison step (step S801) in which the signal level of the detected digital watermark information is compared with the predetermined threshold (Th), the signal level is determined to be lower than the threshold (Th), the holding timer measures the time elapsed since latest digital watermark information WM was detected, and determines whether the elapsed time has reached a holding time T (step S806).

After updating the copy control information in the digital watermark information WM in step S803, if the elapsed time has not reached the holding time T, the process proceeds to step S804 to determine whether a reset signal has been input. The reset signal detected in step S804 is that which is generated by the state change detector 2077 for detecting a content-to-content transition and is input to the WM analyzer 2076.

If it is determined in step S804 that the reset signal is input to the WM analyzer 2076 from the state change detector 2077, the copy control information represented in the digital watermark information WM that is held in the WM analyzer 2076 and has been applied as control information is reset to the "undefined" state. In a case in which it is determined in step S806 that the time elapsed since the latest digital watermark information WM was detected has reached the holding time T, the copy control information is also reset to the "undefined" state in step S805.

In the present invention, as described above, when a content-to-content transition occurs, a current content switched to from a previous content can be prevented from being erroneously subjected to copy control according to copy control information assigned to the previous content.

In the specific example described above, two PN code series are detected at the same time. Alternatively, two PN code series may be detected separately and time-sequentially. More specifically, detection using the code series PNa is first performed. If the copy control mode designated by the copy control information detected using the code series PNa is not "Copy Once", the designated copy control mode is employed as the result of WM analysis. However, if the copy control mode is "Copy Once", detection is further performed using the code series PNb, and the copy control mode is determined in accordance with the detected two pieces of copy control information. In this method, when analysis of digital watermark is performed again after resetting is performed, the analysis started with the detection using PNa. Alternatively, after detection using the code series PNa, detection using the code series PNb is subsequently performed regardless of whether the detected copy control mode is "Copy Once" or not, and final decision is always made by comparing the two detection results.

Figure 15:
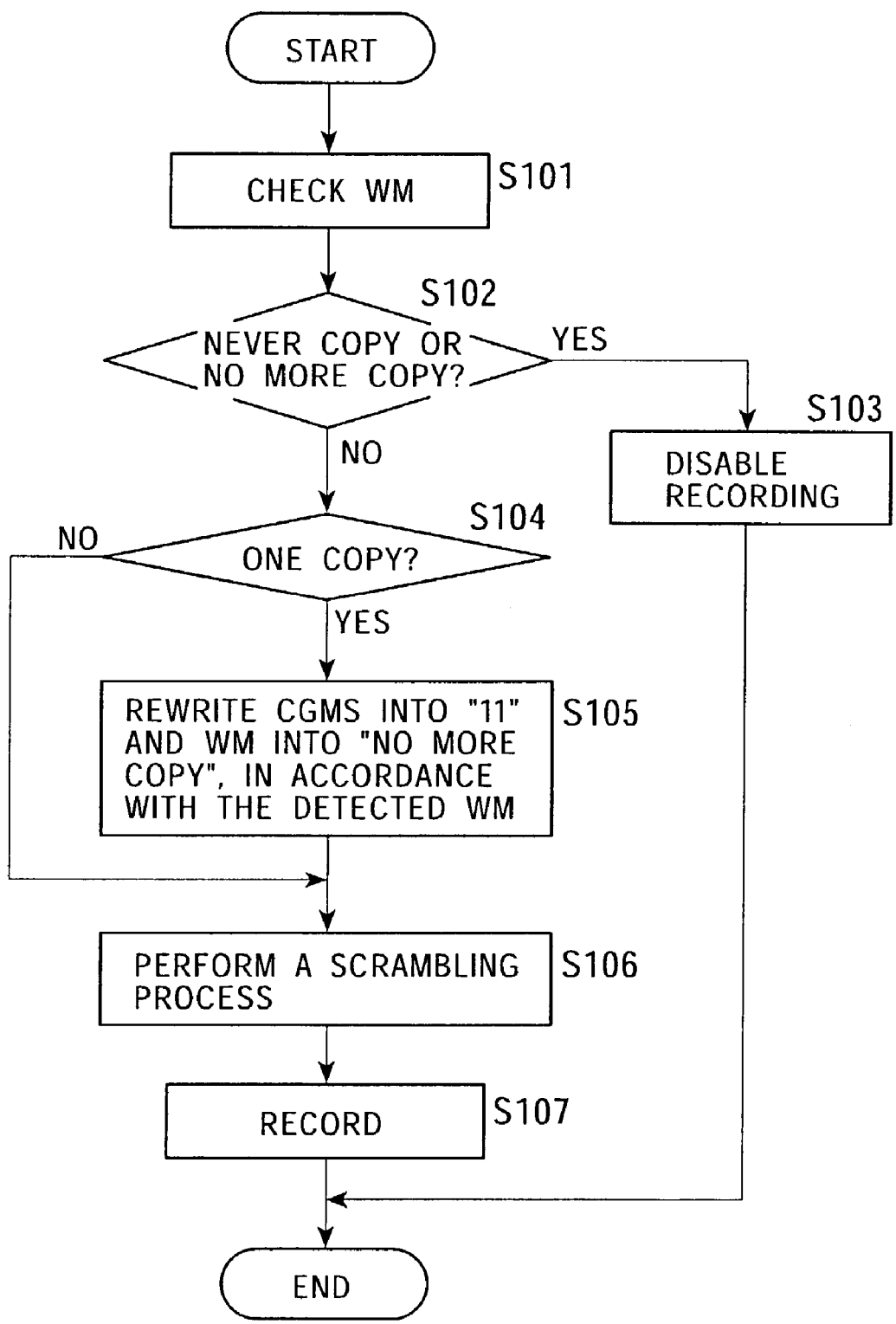
FIG. 15 is a flow chart showing a processing operation performed by the recording apparatus shown in FIG. 10.

The process performed by the recording apparatus 200 after the completion of decryption is described below with reference to the flow chart shown in FIG. 15.

First, in step S101, the decoded digital watermark information WM output from the WM decoder 207 is checked. In the next step S102, it is determined whether the digital watermark information WM designates either "Never Copy" mode or the "No More Copy" mode. If either one of modes is designated, the process proceeds to step S103. In step S103, recording operation is disabled, and the recording process is terminated. In a case in which neither one of modes is designated, the process proceeds to step S104. The "Never Copy" mode is not detected for video information input via the digital input terminal. However, in the case of video information input via the analog input terminal, the "Never Copy" mode can be detected.

In step S104, it is determined whether the digital watermark information WM designates the "Copy Once" mode. If the "Copy Once" mode is not designated, then the possible mode is the "Copy Free" or the "undefined" mode, and thus the process jumps to step S106 in which the video data is scrambled. In the next step 107, the scrambled video data is recorded on the RAM disk 30.

In the case in which the "Copy Once" mode is designated by the digital watermark information WM, the process proceeds to step S105. In step S105, in accordance with the detected digital watermark information WM, the CGMS rewriter 209 rewrites the CGMS information into "11", and the WM rewriter 208 rewrites the digital watermark information WM into "No More Copy". Note that in this specific embodiment, as described earlier, the rewriting of the digital watermark information is actually performed by further superimposing digital watermark information WM designating "No More Copy" in addition to the existing digital watermark information.

After completion of step S105, the process proceeds to step S106 to scramble the video data. In step S107, the scrambled video data is recorded on the RAM disk 30. In this recording process, additional information (scramble flag) indicating that the recorded information is scrambled is also recorded on the RAM disk 30.

In the case in which the digital watermark information WM designates the "Copy Free" mode or the "undefined" mode, the process may jump to step S107 after step S104 so that the video data is recorded directly on the RAM disk 30 without performing scrambling. However, it is more desirable to perform scrambling (encryption) whenever recording on a RAM disk 30 is performed, so that illegally copied information can be easily detected when it is tried to be played back, as described later.

In the recording apparatus according to the present embodiment, as described above, the CGMS information is rewritten in accordance with the digital watermark information WM and recorded. As described earlier, it is very difficult to tamper with the digital watermark information WM to fraudulently copy video information, because the digital watermark information is superimposed in the same ranges in the frequency domain and in the time domain as those of the video information. Therefore, it can be expected that the CGMS information will be rewritten always correctly and recorded on the RAM disk 30.

This makes is possible for even an apparatus having a capability of performing generation-based copy control using only CGMS information to correctly perform copy control. Furthermore, effective copy control is possible also in a case in which when information recorded on a RAM disk 30 is played back and the played-back digital information is transmitted via an IEEE1394 interface, transmission of video data and a decryption key is controlled in accordance with only CGMS information.

[Compliant Playback Apparatus]

An example of a construction of the compliant playback apparatus 300 is described below with reference to FIGS. 16 to 19.

Figure 16:
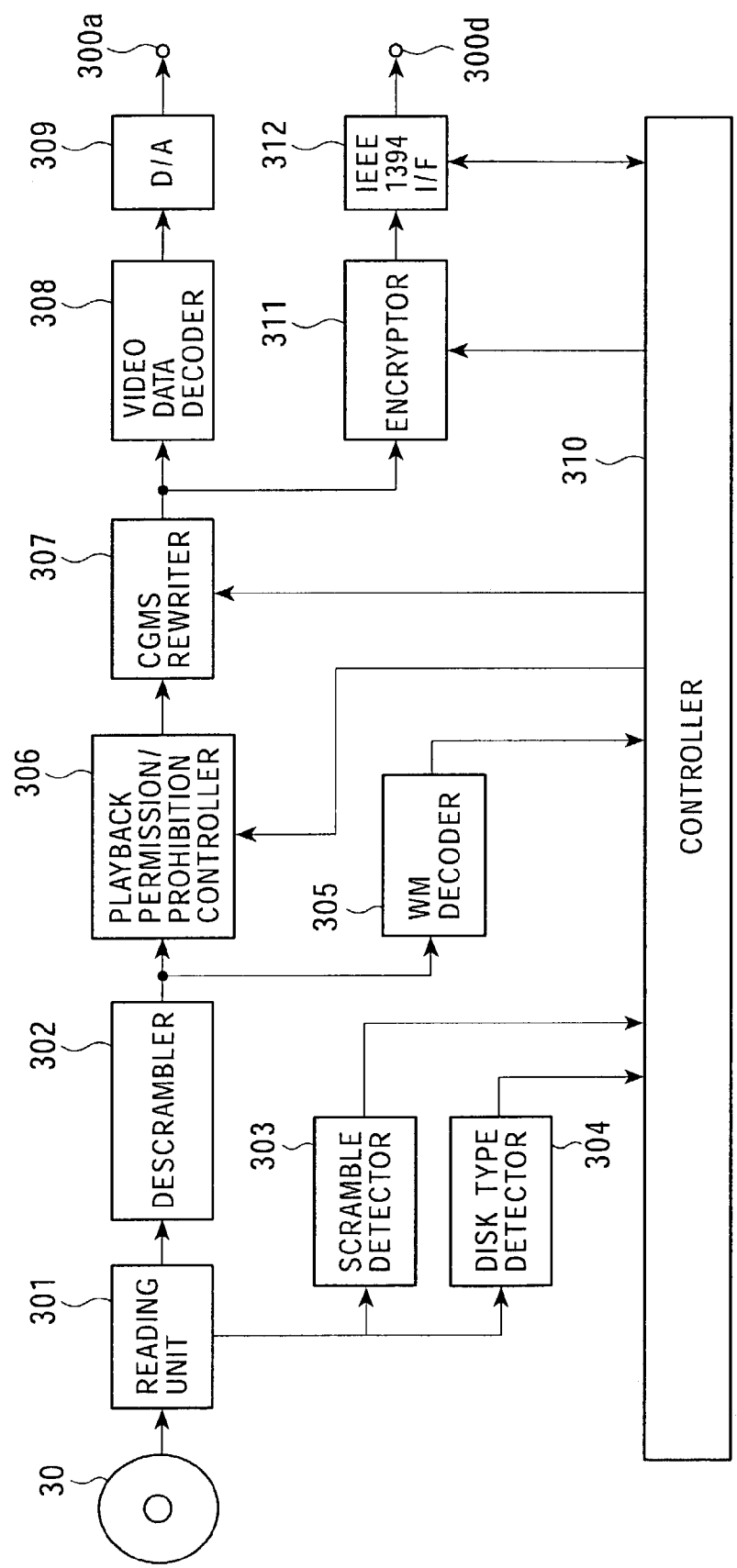
FIG. 16 is a block diagram showing an example of a compliant playback apparatus used in an embodiment according to the present invention.

FIG. 16 is a block diagram showing the general construction of the compliant playback apparatus 300. As shown in FIG. 16, information recorded on a disk 30 mounted on the playback apparatus 300 is read by a reading unit 301 and supplied to a descrambler 302, a scramble detector 303, and a disk type detector 304.

The scramble detector 303 extracts a scramble flag recorded as additional information on the disk 30 and determines whether the recorded information is scrambled or not. Data indicating the detection result is supplied to a controller 310. Herein, it is assumed that when a ROM disk includes CGMS information having a value of "11" or digital watermark information designating the "Never Copy" copy control mode, that is, when the ROM disk is prohibited being copied, information recorded on the ROM disk is scrambled according to the CSS (Contents Scramble System) scheme.

The disk type detector 304 determines whether the mounted disk is a RAM disk or a ROM disk, on the basis of, for example, TOC or directory information. Data indicating the detected disk type is supplied to the controller 310.

The descrambler 302 descrambles the information scrambled by the scrambler 211 of the recording apparatus 200. In the case of information recorded on a RAM disk by a non-compliant recording apparatus, there is a possibility that the information is not scrambled. Such information is also subjected to the descrambling process performed by the descrambler 302. Therefore, if information recorded on a RAM disk by a non-compliant recording apparatus is tried to be played back, the result is that the descrambling causes the non-scrambled information to be converted into a seemingly scrambled form that cannot provide a normal picture or sound.

The descrambler 302 is also capable of descrambling CSS-scrambled information recorded on a ROM disk. The descrambling scheme employed by the descrambler 302 is determined and controlled by the controller 310 on the basis of data output from the disk type detector 304 and indicating whether the disk if a RAM disk or a ROM disk.

The data output from the descrambler 302 is supplied to a WM decoder 305 and a playback permission/prohibition controller 306. The WM decoder 305 extracts digital watermark information WM and decodes it. The decoded digital watermark information WM is supplied to the controller 310.

The controller 310 determines whether to permit or prohibit playback, on the basis of the detection result supplied from the scramble detector 303, the detection result supplied from the disk type detector 304, and the decoded digital watermark information WM. In a case in which the controller 310 determines that playback is prohibited, the controller 310 supplies control signal to the playback permission/prohibition controller 306 to disable the process performed by parts following the playback permission/prohibition controller 306. Thus, when it is determined that playback is prohibited, neither an analog playback signal nor a digital signal via the IEEE1394 interface is output.

In the case in which it is determined that playback is permitted, the process performed by parts following the playback permission/prohibition controller 306 is enabled, and video data output from the playback permission/prohibition controller 306 is supplied to a CGMS rewriter 307. The CGMS rewriter 307 rewrites the CGMS information, as with the set-top box 100, so that the CGMS information becomes consistent with the digital watermark information WM extracted and decoded by the WM decoder 305. More specifically, if the signal level of detected digital watermark information is higher than the threshold Th and the elapsed time is within the holding time T, the CGMS information is rewritten in accordance with the digital watermark information WM.

However, in a case in which digital watermark information having a signal level higher than the threshold Th is not detected within a period of holding time T and digital watermark information is determined to be "undefined", or in a case in which the a content-to-content transition is detected by the state change detector disposed in the WM decoder 305 and a reset signal is input to the WM analyzer whereby the digital watermark information is determined to be "undefined", rewriting of the CGMS information according to the digital watermark information WM is not performed.

Compressed digital video data output from the CGMS rewriter 307 is supplied to a video data decoder 308 to decode the MPEG-compressed data into a decompressed form. The resultant data decoded into the decompressed form is supplied to a D/A converter 309 to convert it into an analog signal. The resultant analog signal is supplied to an external electronic device via the analog output terminal 300a.

The WM decoder 305 is constructed in the same manner as the WM decoder 207 shown in FIG. 10. That is, in the WM decoder 305, if a state change detector detects a content-to-content transition, the state change detector outputs a reset signal to a WM analyzer. Tf the WM analyzer receives the reset signal from the state change detector, the WM analyzer outputs an "undefined"-state signal.

The compressed digital video data from the CGMS rewriter 307 is digitally output via an IEEE1394 interface bus. In this outputting process, as described earlier, the IEEE1394 secure bus prevents the data from being fraudulently copied.

More specifically, the data output from the CGMS rewriter 307 is supplied to an encryptor 311, and the encryptor 311 encrypts the received video data in the compressed form, under the control of the controller 310, by using an encryption key that is changed from communication to communication. The encryption performed by the encryptor 311 is performed in a similar manner as is performed by the encryptor 108 of the set-top box 100 described above.

The encrypted data output from the encryptor 311 is supplied to a destination electronic device via an IEEE1394 interface 312 and further via an output terminal 300b. In this process, the IEEE1394 interface 312 output the data after converting it into a form which satisfies the IEEE1394 interface specifications.

Furthermore, in this process, the controller 310 communicates with the destination device via the IEEE1394 interface 312 to determine whether the destination device is a compliant device. If the destination device is a compliant device, the controller 110 further determines whether the destination device is a recording apparatus.

Thereafter, the controller 310 determines whether decryption key information necessary to decrypt the encryption performed by the encryptor 311 should be transmitted to the destination device, on the basis of, in this specific embodiment, the copy control information decoded by the WM decoder 305 and the type of the destination device indicated by information given through the IEEE1394 interface 312. In a case in which plural pieces of copy control information are output from the WM decoder 305, the controller 310 employs copy control information having a control mode closest to the Never Copy mode.

In a case in which the destination device is a non-compliant apparatus, the decryption key information is not transmitted to the destination device Even when the destination device is a compliant apparatus, if the destination device is a recording apparatus and if the "No More Copy" or "Never Copy" mode is designated by the digital watermark information WM, the decryption key information is not transmitted to the destination device.

Figure 17:
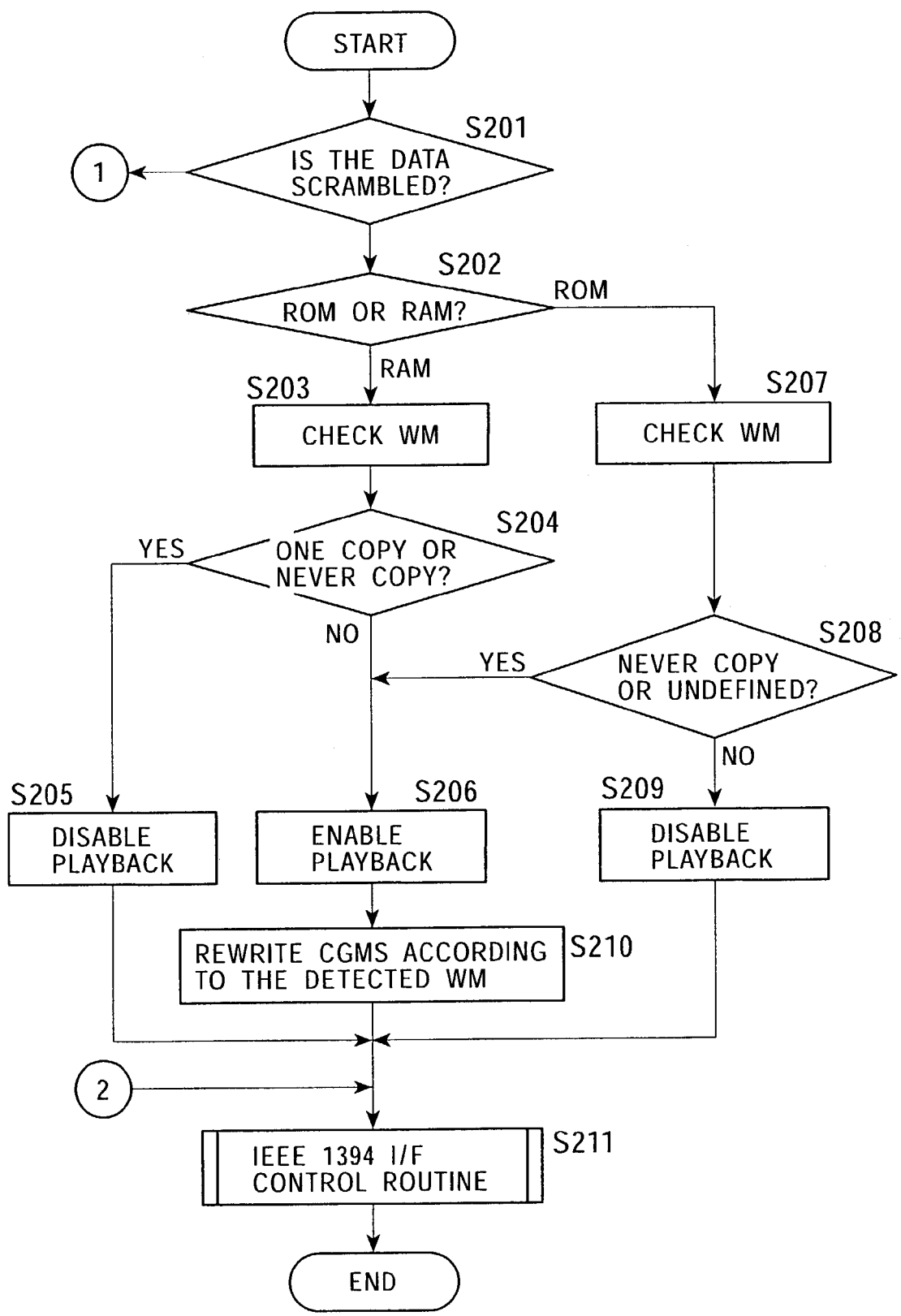
FIG. 17 is a flow chart showing a processing operation performed by the playback apparatus shown in FIG. 16.

The processing operation performed by the compliant playback apparatus 300 according to the present embodiment is described below with reference to FIGS. 17 to 19.

In the playback apparatus 300, in the first step S201, it is determined whether data recorded on a disk mounted on the playback apparatus 300 is scrambled. The scrambling to be detected in this step may have been performed by the scrambler 211 of the recording apparatus 200 or may have been by means of the CSS scheme on a ROM disk. If the data is scrambled, the process proceeds to step S202 to further determine whether the disk is a ROM disk or a RAM disk.

If the disk is a RAM disk, the process proceeds to step S203 to check the digital watermark information WM. In the next step S204, it is determined whether the copy control mode designated by the digital watermark information WM is "Copy Once" or the "Never Copy". If either one of these modes is designated, the process proceeds to step S205 to disable the playing-back operation.

The reason why playback is disabled in the case in which it is determined in step S204 that the digital watermark information WM designates the "Copy Once" mode is that the fact that the data is scrambled indicates that the disk 30 is a RAM disk and that the data has been recorded on that RAM disk using the compliant recording apparatus 200, but, nevertheless, the fact that the digital watermark information WM designates the "Copy Once" mode indicates that the data has been illegally copied.

The reason for the above conclusion is that if data is recorded on a RAM disk using the compliant recording apparatus 200, digital watermark information WM must be rewritten from "Copy Once" to "No More Copy".

The reason why when the disk is a RAM disk, playback is disabled if the digital watermark information WM indicates the "Never Copy" mode is that the data recorded on this RAM disk must be that illegally copied from a ROM having digital watermark information WM designating the "Never Copy" mode.

In a case in which it is determined in step S204 that the copy control mode designated by the digital watermark information WM is neither "Copy Once" nor the "Never Copy", the process proceeds to step S206 to enable the playing-back operation. In the next step S210, the CGMS information (CGMS-D information) associated with the digital video data is rewritten in accordance with the digital watermark information WM detected by the WM decoder 305 so that the digital watermark information WM and the CGMS information become consistent with each other.

More specifically, if the signal level of detected digital watermark information is higher than the threshold Th and the elapsed time is within the holding time T, the CGMS information is rewritten in accordance with the digital watermark information WM. However, in a case in which digital watermark information having a signal level higher than the threshold Th is not detected within a period of holding time T and digital watermark information is determined to be "undefined", or in a case in which the a content-to-content transition is detected by the state change detector of the WM decoder 305 and a reset signal is input to the WM analyzer whereby the digital watermark information is determined to be "undefined", rewriting of the CGMS information according to the digital watermark information WM is not performed.

Thereafter, in step 211, digital data is output via the IEEE1394 interface.

In the case in which it is determined in step S202 that the mounted disk is a ROM disk, the process proceeds to step S207 to check the digital watermark information WM. In the next step S208, it is determined whether the digital watermark information WM designates the "Never Copy" mode. This determination is performed in order to confirm that the data has been CSS-scrambled and the digital watermark information correctly designates the "Never Copy" mode that should be designated in any ROM disk that is prohibited from being copied.

If it is determined in this step S208 that the digital watermark information neither designates the "Never Copy" mode nor is in the "Undefined" state, it is determined that the ROM disk has been tampered with. In this case, the process proceeds to step S209 to disable playback. If the "Never Copy" mode is correctly designated or the digital watermark information WM is in the "undefined" state, the process proceeds to step S206 to enable the playing-back operation. In this case, the process then proceeds to step S210 to rewrite the CGMS information into "11". (Note that rewriting is not performed when the digital watermark information is in the "Undefined" state.) Thereafter, the process further proceeds to step S212 to output digital data.

Figure 18:
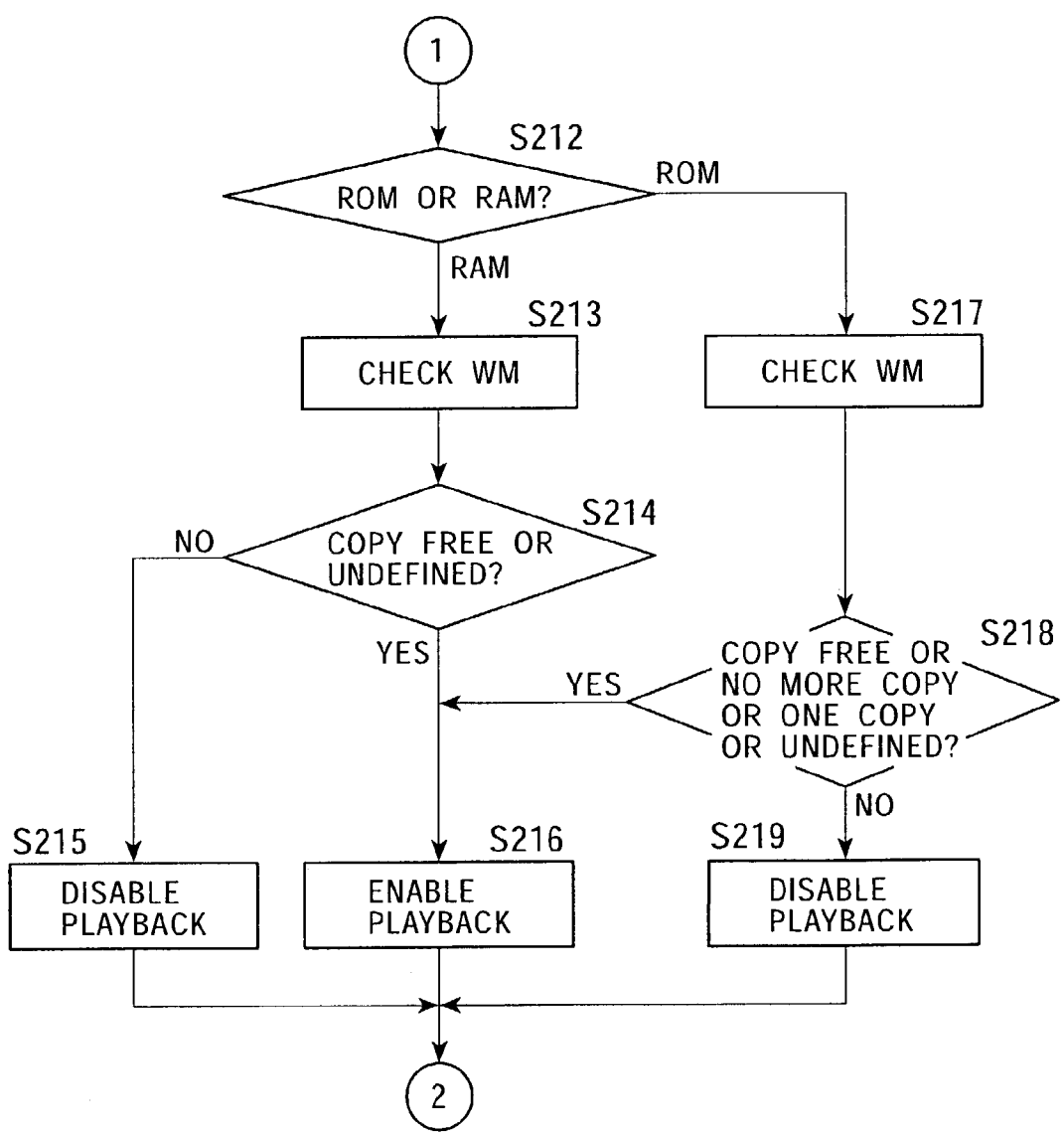
FIG. 18 is a flow chart showing a processing operation performed by the playback apparatus shown in FIG. 16.
Figure 19:
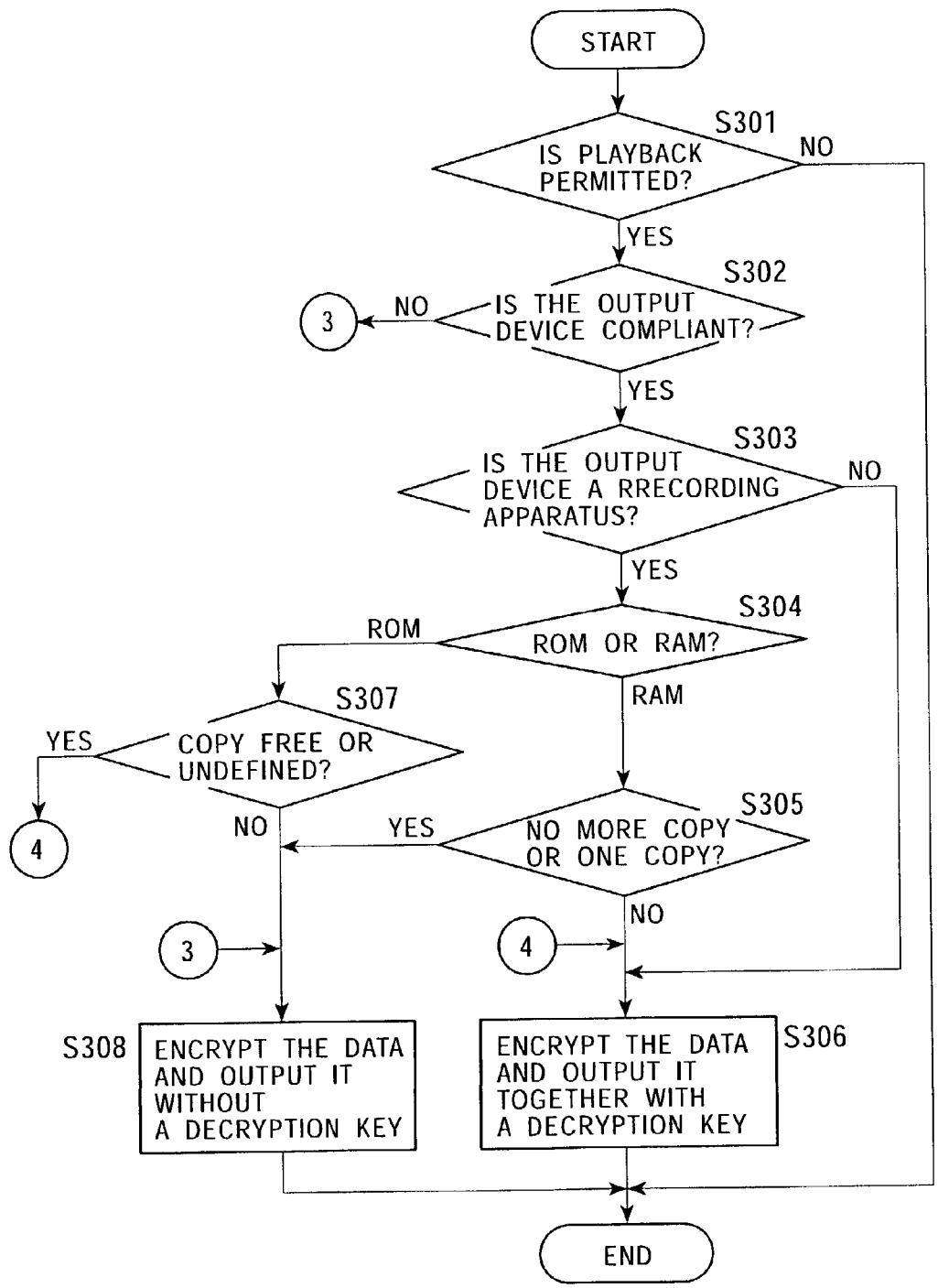
FIG. 19 is a flow chart showing a digital output control process performed by the playback apparatus shown in FIG. 16.

In a case in which it is determined in step S201 that the information recorded on the disk is not scrambled, the process proceeds to step S212 shown in FIG. 18 to further determine whether the disk is a ROM disk or a RAM disk. If the disk is determined to be a RAM disk, the process proceeds to step S213 to check the digital watermark information WM.

In the next step S214, it is determined whether the digital watermark information WM either designates the "Copy Free" mode or is in the "Undefined" state. If no, it is determined that illegal tampering has been performed, and the process proceeds to step S215 to disable playback. On the other hand, if it is determined in step S214 that the digital watermark information WM either designates the "Copy Free" mode or is in the "Undefined" state, the process proceeds to step S216 to enable playback.

In the case in which it is determined in step S212 that the disk is a ROM disk, the process proceeds to step S217 to check the digital watermark information WM. Then it is determined whether the digital watermark information WM designates either one of modes including "Copy Free", "No More Copy", "One Copy", and "Undefined". If yes, then the process proceeds to step S216 to enable playback. However, if no, the process proceeds to step S219 to disable playback.

That is, in the present embodiment, when the disk is a ROM disk, if the digital watermark WM designates the "Never Copy" mode, the data recorded on the ROM disk must have been CSS-scrambled. In other words, if the data has not been scrambled and if the "Never Copy" mode is designated, then it cab be concluded that the data has been subjected to illegal tampering, and thus playback is disabled.

Now, the outputting process in step S211 is described in more detail below. FIG. 19 is a flow chart showing the outputting digital data via the IEEE1394 interface. This process is performed by means of IEEE1394 secure bus described earlier.

In step S301, it is determined whether playback is permitted. If playback is prohibited, the outputting routine is terminated. However, if playback is permitted, the process proceeds to step S302. In step S302, communication with an destination device is performed via the IEEE1394 bus to determine whether the destination device is a compliant apparatus. If the destination device is not a compliant apparatus, the process proceeds to step S308 in which encrypted (MPEG-compressed) digital information is output. In this case, a decryption key necessary to decrypt the encrypted digital data is not transmitted to the destination device. This makes it impossible for any non-compliant apparatus to decrypt encrypted data.

In a case in which it is determined in step S302 that the destination device is a compliant apparatus, the process proceeds to step S303 to further determine whether the compliant destination device is a recording apparatus. If the destination device is not a recording apparatus, the process jumps to step S306, in which digital information (MPEG-compressed data) is encrypted and output together with a decryption key necessary to decrypt the encrypted digital information to the destination device.

In a case in which it is determined in step S303 that the destination device is a compliant recording apparatus, the process proceeds to step S304 to further determine whether the disk is a ROM disk or a RAM disk. If the disk is a RAM disk, the process proceeds to step S305, in which, in the present embodiment, it is further determined whether the digital watermark information WM designates either the "No More Copy" mode or the "One Copy" mode.

If the digital watermark information designates neither the "No More Copy" mode nor the "One Copy" mode, the process proceeds to step S306, in which digital information (MPEG-compressed data) is encrypted and output together with a decryption key necessary to decrypt the encrypted digital information to the destination device. If the digital watermark information designates either "No More Copy" mode or the "One Copy" mode, the process proceeds to step S308, in which digital information (MPEG-compressed data) is encrypted and output to the destination device, but a decryption key necessary to decrypt the encrypted digital information is not transmitted to the destination device.

If it is determined in step S304 that the disk is a ROM disk, the process proceeds to step S307 to determine whether the digital watermark information either designates the "Copy Free" mode or is in the "Undefined" state. If yes, the process proceeds to step S306, in which digital information (MPEG-compressed data) is encrypted and output together with a decryption key necessary to decrypt the encrypted digital information to the destination device. However, if no, the process proceeds to step S308, and digital information (MPEG-compressed data) is encrypted and output to the destination device, but a decryption key necessary to decrypt the encrypted digital information is not transmitted to the destination device.

In the playback apparatus according to the present embodiment, as described above, when digital video data is output, the copyright of the digital video data is protected by means of the secure bus of the IEEE1394 interface, and CGMS information included in the video data to be output is rewritten in accordance with digital watermark information WM having very high resistance against illegal tampering so that the CGMS information becomes consistent with the digital watermark information WM.

This ensures that when the digital video data received from the playback apparatus is recorded by a recording apparatus, copy control is correctly performed in accordance with the CGMS information.

In the playback apparatus 300, the IEEE1394 interface may determine whether to transmit the decryption key to the destination device, on the basis of CGMS information rewritten by the CGMS rewriter 307. In this case, when the destination device is a compliant recording apparatus, if the CGMS information has a value of "11", the decryption key information is not transmitted to the destination device.

Also in this playback apparatus 300, as with the set-top box 100 described earlier, when an analog video signal is output from the D/A converter 309, CGMS-A information described in accordance with the digital watermark information WM may be added to the analog video signal.

A decoder for decoding CGMS information added to played-back video data may be provided, and, if comparison between the digital watermark information WM decoded by the WM decoder 305 and the CGMS information decoded by the CGMS decoder indicates that the copy control mode designated by the CGMS information is closer to the Never Copy mode, the CGMS information may not be rewritten. Of course, if there is no inconsistency between the CGMS information and the digital watermark information WM, the CGMS information may not be rewritten.

[Modifications]

In the above-described embodiment of the playback apparatus, playback restriction is accomplished by disabling any playback operation. Alternatively, restriction may be achieved by disabling an information signal from being reproduced into a normal form. For example, when the information signal is a video signal, the video signal may be converted into a form that cannot be visually understood. In the case of an audio signal, noise may be generated. That is, any restriction method may be employed as long as it can substantially prevent a normal information signal from being played back. When playback of a disk is prohibited, a message indicating, for example, that the disk is cannot be played back because the disk includes illegally copied data may be visually displayed on a screen or acoustically output from a speaker.

In the embodiments described above, CGMS information is employed as additional information that is added together with digital watermark information. As a matter of course, the additional information is not limited to CGMS information.

The digital watermark information is not limited to spectrum-spread digital watermark information employed in the embodiments described above. The digital watermark information may be represented in many other forms. For example, additional information with a low signal level may be superimposed on a digital signal. When data is compressed by means of MPEG compression or the like using an orthogonal transformation, additional information with a low signal level may be superimposed on frequency components of the compressed data such that the additional information seems like noise. Another technique of superimposing additional information is to divide a screen into a plurality of small areas with predetermined sizes and paste a unit digital watermark pattern to each small area thereby superimposing the digital watermark on video signal.

The rewritable recording medium is not limited to recording disks, but other types of recording media such as a semiconductor memory or a magnetic tape may also be employed. The information signal is not limited to video signals, but the information signal may be an audio signal.

Although in the embodiments described above, the recording apparatus and the playback apparatus are constructed in separated forms, the present invention may also be applied to an apparatus in which the recording apparatus and the playback apparatus are integrated. Although in the above-described embodiments according to the present invention, the set-top box is employed as the apparatus for outputting an information signal, the present invention may also be applied to a broadcasting apparatus or a computer that is connected to a network to re-transmit digital video data acquired from another computer or a server over the network.

Although in the embodiments described above, not only CGMS information but also digital watermark information is rewritten, only CGMS information may be rewritten without rewriting digital watermark information.

The present invention has been described in detail above with reference to particular embodiments. It will be apparent to those skilled in the art that various modifications and substitution to those embodiments may be made in the embodiment chosen for illustration without departing from the spirit and scope of the invention. That is, the embodiments have been described above by way of example and not limitation. The scope of the invention is to be determined solely by the claims.

Note that processes disclosed herein in the present description may be executed by hardware, software, or a combination of hardware and software. Execution of processes by software may be accomplished by installing a program, in which a sequence of processing steps is described, into a memory disposed in a computer embedded in dedicated hardware, or by installing such a program into a general-purpose computer capable of executing various kinds of processes.

The program may be stored, in advance, on a hard disk serving as a storage medium or in a ROM (Read Only Memory). Alternatively, the program may be stored (recorded) temporarily or permanently on a removable storage medium such as a floppy disk, a CD-ROM (Compact Disc Read Only Memory), an MO (Magnetooptical) disk, a DVD (Digital Versatile Disc), a magnetic disk, or a semiconductor memory. Such a removable recording medium may be provided in the form of so-called package software.

Instead of installing the program from such a removable storage medium onto the computer, the program may also be transferred to the computer from a download site by means of radio transmission or by means of cable transmission via a network such as an LAN (Local Area Network) or the Internet. In this case, if the computer receives the program transmitted in such a manner, the computer installs the program on a storage medium such as a hard disk disposed in the computer.

The processes disclosed in the present description may be executed time-sequentially in the same order as processing steps are described in the program, or may be executed in parallel or individually depending on the capacity or capability of an apparatus which executes processes. In the present description, the term "system" is used to describe a logical collection of a plurality of devices, and it is not necessarily required that the plurality of devices are disposed in a single case.

INDUSTRIAL APPLICABILITY

In the data processing apparatus, the data processing method, and the program, according to the present invention, as described above, copy control information in the form of digital watermark information (WM) is embedded in a content to control copying of the content in accordance with the embedded copy control information, such that a content-to-content transition is detected by detecting a change in a content state such as a change in image luminance, or a change in copy control information associated with a content or is detected on the basis of a flag, a descriptor, or channel switching; and in response to detection of a content-to-content transition, a reset signal is output to the WM analyzer that is outputting the copy control information to reset the current copy control information into a "undefined" state so that copy control is performed in a mode such as a "Copy Free" control mode assigned to the "undefined" state, thereby ensuring that when a previous content is switched to a present content, the present content is prevented from being incorrectly subjected to a copy control process according to copy control information assigned to the previous content.

Furthermore, in the data processing apparatus, the data processing method, and the program, according to the present invention, as described above, copy control information in the form of digital watermark information (WM) is embedded in a content to control copying of the content in accordance with the embedded copy control information, such that when the digital watermark information (WM) is in an undefined state, the reliability of information such as CGMS information other than digital watermark information (WM) is evaluated by checking consistency between the information other than the digital watermark information and the digital watermark information (WM) on the basis of history information, and, if the information such as CGMS information other than the digital watermark information (WM) is determined highly reliable, copy control is performed in accordance with the information other than the digital watermark information (WM), thereby ensuring that copy control is performed in a highly reliable fashion.

The invention claimed is:

1. A digital watermark decoding system for use in data processing apparatus for performing at least one of a data recording process, a data playing-back process, and a data inputting/outputting process, in which copy control information represented in digital watermark information is detected, and copying of data is controlled in accordance with the detected copy control information included in the digital watermark information, said digital watermark decoding system detecting a digital watermark embedded in a content and outputting detected copy control information as control information applied to a content to be processed, said digital watermark decoding system comprising:

state change detection means for detecting a transition from a content to another content having a possibility that copy control information embedded therein is different from copy control information embedded in the former content, and outputting a reset signal to digital watermark information analysis means in response to detecting of a state change corresponding to the content transition; and digital watermark information analysis means for resetting control information applied to the content in accordance with the reset signal received from the state change detection means, and outputting, as control information to be applied to the content, undefined control information corresponding to non-detection of a digital watermark, wherein when the digital watermark information output from the digital watermark information analysis means is undefined, and when a content to be processed includes copy control information, added thereto, other than digital watermark information, the copy control information other than the digital watermark information is employed as control information to be applied to the content.

2. The digital watermark decoding system according to claim 1, wherein when the digital watermark information output from the digital watermark information analysis means is undefined, and when a content to be processed includes copy control information, added thereto, other than digital watermark information, history of the copy control information other than digital watermark information and history of copy control information described in the digital watermark information are checked to determine whether these two kinds of copy control information were consistent with each other over a predetermined period, and, only when it is determined that the two kinds of copy control information were consistent with each other over that period, the copy control information other than digital watermark information is employed as copy control information to be applied to the content.

3. The digital watermark decoding system according to claim 1, wherein said copy control information other than digital watermark information is copy generation management system information.

4. The digital watermark decoding system according to claim 1, wherein the state change detection means monitors a change in signal information of a content being processed; and, when a change greater than a predetermined threshold is detected, the state change detection means determines that a content-to-content transition has occurred, and the state change detection means outputs a reset signal to the digital watermark information analysis means.

5. The digital watermark decoding system according to claim 1, wherein the state change detection means monitors a change in copy control information serving as additional information other than digital watermark information, added to a content being processed; and, when a change is detected, the state change detection means determines that a content-to-content transition has occurred, and the state change detection means outputs a reset signal to the digital watermark information analysis means.

6. The digital watermark decoding system according to claim 1, wherein the state change detection means monitors a change in one of a descriptor and a flag serving as additional information other than digital watermark information, added to a content being processed; and, when a change is detected, the state change detection means determines that a content-to-content transition has occurred, and the state change detection means outputs a reset signal to the digital watermark information analysis means.

7. The digital watermark decoding system according to claim 1, wherein the state change detection means monitors channel switching; and, when channel switching is detected, the state change detection means determines that a content-to-content transition has occurred, and the state change detection means outputs a reset signal to the digital watermark information analysis means.

8. The digital watermark decoding system according to claim 1, wherein the state change detection means monitors presence/absence of an input signal and determines that a content-to-content transition has occurred when one of a presence-to-absence transition, an absence-to-presence transition, and a presence-to-absence-to-presence transition is detected, and the state change detection means outputs a reset signal to the digital watermark information analysis means in response to the detection of the content-to-content transition.

9. A digital watermark decoding method for use with a data processing method of performing at least one of a data recording process, a data playing-back process, and a data inputting/outputting process, in which copy control information represented in digital watermark information is detected, and copying of data is controlled in accordance with the detected copy control information included in the digital watermark information, said digital watermark decoding method including detecting a digital watermark embedded in a content and outputting detected copy control information as control information applied to a content to be processed, said digital watermark decoding method comprising the steps of:

detecting a transition from a content to another content having a possibility that copy control information embedded therein is different from copy control information embedded in the former content, and outputting a reset signal to digital watermark information analysis means in response to detecting of a state change corresponding to the content transition; and resetting control information applied to the content in accordance with the input reset signal, and outputting, as control information to be applied to the content, undefined control information corresponding to non-detection of a digital watermark, wherein when the digital watermark information output from the digital watermark information analysis means is undefined, and when a content to be processed includes copy control information, added thereto, other than digital watermark information, the copy control information other than the digital watermark information is employed as control information to be applied to the content.

10. The digital watermark decoding method according to claim 9, wherein when the digital watermark information output from the digital watermark information analysis means is undefined, and when a content to be processed includes copy control information, added thereto, other than digital watermark information, a history of the copy control information other than digital watermark information and history of copy control information described in the digital watermark information are checked to determine whether these two kinds of copy control information were consistent with each other over a predetermined period, and only when it is determined that the two kinds of copy control information were consistent with each other over that period, the copy control information other than digital watermark information is employed as copy control information to be applied to the content.

11. The digital watermark decoding method according to claim 9, wherein said copy control information other than digital watermark information is copy generation management system information.

12. The digital watermark decoding method according to claim 9, wherein the state change detecting step includes monitoring a change in signal information of a content being processed; and, when a change greater than a predetermined threshold is detected, determining that a content-to-content transition has occurred and outputting a reset signal to the digital watermark information analysis means.

13. The digital watermark decoding method according to claim 9, wherein the state change detecting step includes monitoring a change in copy control information serving as additional information other than digital watermark information, added to a content being processed; and, when a change is detected, determining that a content-to-content transition has occurred and outputting a reset signal to the digital watermark information analysis means.

14. The digital watermark decoding method according to claim 9, wherein the state change detecting step includes monitoring one of a change in a descriptor and a flag serving as additional information other than digital watermark information, added to a content being processed; and when a change is detected, determining that a content-to-content transition has occurred and outputting a reset signal to the digital watermark information analysis means.

15. The digital watermark decoding method according to claim 9, wherein the state change detecting step includes monitoring channel switching; and, when channel switching is detected, determining that a content-to-content transition has occurred, and outputting a reset signal to the digital watermark information analysis means.

16. The digital watermark decoding method according to claim 9, wherein the state change detecting step includes monitoring a presence/absence of an input signal, determining that a content-to-content transition has occurred when one of a presence-to-absence transition, an absence-to-presence transition, and a presence-to-absence-to-presence transition is detected, and outputting a reset signal to the digital watermark information analysis means in response to detection of the content-to-content transition.

17. A digital watermark decoding method for use in a computer program for causing a computer system to execute at least one of a data recording process, a data playing-back process, and a data inputting/outputting process, in which copy control information represented in digital watermark information is detected, and copying of data is controlled in accordance with the detected copy control information included in the digital watermark information, said digital watermark decoding method including detecting a digital watermark embedded in a content and outputting detected copy control information as control information applied to a content to be processed, said digital watermark decoding method comprising the steps of:

detecting a transition from a content to another content having a possibility that copy control information embedded therein is different from copy control information embedded in the former content, and outputting a reset signal to digital watermark information analysis means in response to detecting of a state change corresponding to the content transition; and resetting control information applied to the content in accordance with the input reset signal, and outputting, as control information to be applied to the content, undefined control information corresponding to non-detection of a digital watermark, wherein when the digital watermark information output from the digital watermark information analysis means is undefined, and when a content to be processed includes copy control information, added thereto, other than digital watermark information, the copy control information other than the digital watermark information is employed as control information to be applied to the content.

\* \* \* \* \*